(12) United States Patent
Endo et al.

(10) Patent No.: US 7,512,489 B2
(45) Date of Patent: Mar. 31, 2009

(54) ROUTE SEARCH METHOD AND TRAFFIC INFORMATION DISPLAY METHOD FOR A NAVIGATION DEVICE

(75) Inventors: Yoshinori Endo, Mito (JP); Shinichi Amaya, Sagamihara (JP); Akio Sumizawa, Shindo Sagamihara (JP)

(73) Assignee: Xanavi Informatics Corporation, Zama-shi (JP)

( * ) Notice: Subject to any disclaimer, the term of this patent is extended or adjusted under 35 U.S.C. 154(b) by 495 days.

(21) Appl. No.: 10/771,743

(22) Filed: Feb. 5, 2004

(65) Prior Publication Data

US 2004/0225437 A1 Nov. 11, 2004

(30) Foreign Application Priority Data

Feb. 5, 2003 (JP) ............................. 2003-028847
Mar. 20, 2003 (JP) ............................. 2003-078461

(51) Int. Cl.
*G01C 21/30* (2006.01)
*G01C 21/32* (2006.01)

(52) U.S. Cl. .................. 701/209; 340/995.19; 340/990; 701/208

(58) Field of Classification Search ......... 701/207–209; 340/995.1–995, 995.19
See application file for complete search history.

(56) References Cited

U.S. PATENT DOCUMENTS 5,917,436 A * 6/1999 Endo et al. ............. 340/995.14
5,948,040 A * 9/1999 DeLorme et al. ............ 701/201
6,169,552 B1   1/2001 Endo et al. ................... 345/427
6,278,383 B1 * 8/2001 Endo et al. ............. 340/995.14
6,289,278 B1 * 9/2001 Endo et al. ................... 701/208
6,356,836 B1 * 3/2002 Adolph ....................... 701/208

(Continued)

FOREIGN PATENT DOCUMENTS

CN         1372230         10/2002

(Continued)

OTHER PUBLICATIONS

Adaptability of a hybrid route choice model to incorporating driver behavior dynamics under information provision; Peeta, S.; Yu, J.W.; Systems, Man and Cybernetics, Part A, IEEE Transactions on; vol. 34, Issue 2, Mar. 2004 pp. 243-256 Digital Object Identifier 10.1109/TSMCA.2003.822272.*

(Continued)

*Primary Examiner*—Cuong H Nguyen
(74) *Attorney, Agent, or Firm*—Antonelli, Terry, Stout & Kraus, LLP.

(57) ABSTRACT

A recommended route is searched by the use of traffic information collected in the past. A map/statistical traffic data storage device 3 stores map data including link data of respective links constituting roads on a map, and statistical data including travel time or moving speeds of the respective links determined by statistical values of traffic information collected in the past. Said statistical data is classified every condition of collection of traffic information. A navigation device searches a recommended route from a departure position to a destination by using the map data stored in the map/statistical traffic data storage device and statistical data corresponding to a day type and a weather type which constitute conditions of search, out of statistical data stored in the map/statistical traffic data storage device 3.

21 Claims, 24 Drawing Sheets

U.S. PATENT DOCUMENTS

| | | | |
|---|---|---|---|
| 6,603,407 B2 * | 8/2003 | Endo et al. | 340/995.14 |
| 6,617,980 B2 * | 9/2003 | Endo et al. | 340/905 |
| 6,853,904 B2 * | 2/2005 | Matsuo et al. | 701/200 |
| 7,161,502 B2 * | 1/2007 | Yamada et al. | 340/995.1 |

FOREIGN PATENT DOCUMENTS

| | | | |
|---|---|---|---|
| JP | 08-044997 | | 2/1996 |
| JP | 09-113290 | | 5/1997 |
| JP | 09-280880 | | 10/1997 |
| JP | 10-019593 | | 1/1998 |
| JP | 10-82644 | | 3/1998 |
| JP | 11-272983 | | 10/1999 |
| JP | 2000-146600 | | 5/2000 |
| JP | 2001-091292 | | 4/2001 |
| JP | 2002-071365 | | 3/2002 |
| JP | 2002-162234 | | 6/2002 |
| JP | 2002-372430 | | 12/2002 |
| JP | 02004239741 A | * | 8/2004 |
| JP | 02007047148 A | * | 2/2007 |
| JP | 02007139477 A | * | 6/2007 |
| JP | 02007218924 A | * | 8/2007 |
| JP | 02008096445 A | * | 4/2008 |

OTHER PUBLICATIONS

ADAS applications for improving traffic safety; Meng Lu; Wevers, K.; van der Heijden, R.; Heijer, T.; Systems, Man and Cybernetics, 2004 IEEE International Conference on; vol. 4, Oct. 10-13, 2004 pp. 3995-4002 vol. 4; Digital Object Identifier 10.1109/ICSMC.2004.1400969.*

Implementing traffic flow management-generated reroutes: a concept of operations; Poore, D.S.; Yee, M.; Viets, K.J.; Taber, N.J.; Digital Avionics Systems Conference, 2003. DASC '03. The 22nd; vol. 1, Oct. 12-16, 2003 pp. 5.C.1-51-11 vol. 1 Digital Object Identifier 10.1109/DASC.2003.1245859.*

Routing techniques in wireless sensor networks: a survey; Al-Karaki, J.N.; Kamal, A.E.; Wireless Communications, IEEE [see also IEEE Personal Communications]; vol. 11, Issue 6, Dec. 2004 pp. 6-28; Digital Object Identifier 10.1109-MWC.2004.1368893.*

Makulowich, John, "Traveling by Virtual Reservation," Washington Technology, Jan. 23, 1997, p. 42, cited by others.*

Knecht, Bruce, G., "Microsoft Puts Newspapers in Highanxiety.com," The Wall Street Journal, Jul. 15, 1996, pp. B1, B10, cited by others.*

"InforTravel Expands Service," Business Geographics, vol. 4, No. 6, Jun. 1996, p. 13, cited by others.*

DelRosso, Laura, "Firm Customizes Internet Res Link," Travel Weekly, vol. 55, No. 26, Apr. 1, 1996, pp. 43-44, 47, cited by others.*

* cited by examiner

FIG.4

| DATE 331 | SEARCH CONDITION A (TYPE OF DAY) 332 |
|---|---|
| 2002 / 11 / 28 | WEEKDAY (GENERAL) |
| 2002 / 11 / 29 | WEEKDAY (BEFORE HOLIDAY) |
| 2002 / 11 / 30 | WEEKDAY (GENERAL) |
| 2002 / 12 / 01 | WEEKDAY (GENERAL) |
| 2002 / 12 / 02 | WEEKDAY (AFTER HOLIDAY) |
| 2002 / 12 / 03 | HOLIDAY (GENERAL) |
| ⋮ | ⋮ |

RECOMMENDED ROUTE SEARCH OPERATION

ROUTE SEARCH METHOD AND TRAFFIC INFORMATION DISPLAY METHOD FOR A NAVIGATION DEVICE

BACKGROUND OF THE INVENTION

The present invention relates to a navigation device, and more particularly, to a route search technique and a traffic information display technique for an in-vehicle type navigation device. Japanese Patent Laid-open Publication No. H10-82644 (hereinafter, referred to as Patent Document 1) discloses a technique in which a display configuration of a predetermined road displayed on a display is changed according to the degree of jam, in a navigation device. For example, in the case where the predetermined road is included in a route searched by route search, a portion of the predetermined road included in the route is displayed according to that degree of jam on the road which is judged by traffic information collected during a predetermined period of time in the past. Here, the traffic information collected during a predetermined period of time in the past may be classified every predetermined time zone. In this manner, by changing the traffic information of the road adopted for determination of a display configuration of the road according to a point of time, the display configuration of the road can be changed in conformity to jam changing in real time.

SUMMARY OF THE INVENTION

In the technique described in Patent Document 1, however, the use of traffic information collected in the past for route search is not taken into consideration. Therefore, there is a high possibility that a recommended route of minimum cost (travel time) cannot be searched. Further, jam generated due to unexpected circumstances such as accidents, traffic restriction and the like shows in some cases a tendency different from that in the degree of jam obtained from traffic information collected in the past. Meanwhile, in the case where the degree of jam on a road is represented on the basis of only latest traffic information, there is a possibility that when a user reaches the road distant from a current position, the degree of jam is varied. This is not taken into consideration in the technique described in Patent Document 1.

Also, the technique described in Patent Document 1 takes account of only a time zone as a condition for a change in the tendency of jam on a road. Further, the technique takes no account of a configuration of display in which a user can recognize a change in jam on a road due to a change in time zone.

The present invention has been thought of in view of the above situation, and has its object to enable more accurately searching a recommended route by the use of traffic information collected in the past, or traffic information collected in the past and present traffic information.

Also, it is a further object of the present invention to enable dividing and displaying the tendency of jam in more detail in such a display manner that a user can recognize a change in jam on roads due to a change in time zone. Further, it is a still further object of the present invention to enable displaying the degree of jam on roads in view of the possibility that a user encounters the jam.

In order to solve the above problem, in a first aspect of the route search method according to the present invention, map data including link data of respective links constituting roads on a map is stored in a storage unit of a navigation device. Also, statistical data including travel time or moving speeds of the respective links determined by statistical values of traffic information collected in the past is stored in the storage unit. The statistical data is classified every condition of collection of traffic information. And the navigation device performs setting step which sets a departure position, a destination, and conditions of collection, and recommended route searching step which searches a recommended route from the departure position to the destination by using the map data stored in the storage device and statistical data corresponding to the conditions of collection set, out of the statistical data stored in the storage device.

In this manner, with the use of the statistical data of respective links matched with the condition of collection, it is possible to accurately search a recommended route of minimum cost (travel time).

Also, in a second aspect of the route search method according to the present invention, map data including link data of respective links constituting roads on a map is stored in a storage unit of a navigation device having a current position detecting function. Also statistical data including travel time or moving speeds of the respective links determined by statistical values of traffic information collected in the past is stored in the storage unit. And the navigation device performs setting step which sets a departure position, present status data obtaining step which obtains present status data including travel time or moving speeds determined by present traffic information of respective links located in a peripheral region of a current position detected by the current position detecting function, from outside, and recommended route searching step which searches a recommended route from the current position to the destination by the use of the map data and the statistical data stored in the storage device and the present status data obtained in the present status data obtaining step.

In this manner, a recommended route from a current position to a destination can be searched by using present traffic information (present status data) for a periphery of the current position and traffic information (statistical data) collected in the past for a region except the periphery of the current position in which it is possible that the situation will change from the present traffic information when a user reaches there. Accordingly, it is possible to accurately search a recommended route of minimum cost (travel time).

Also, in a first aspect of the traffic information display method according to the present invention, map data including link data of respective links constituting roads on a map is stored in a storage unit of a navigation device. Also, a degree of jam every time zone of the respective links determined by statistical values of traffic information collected in the past is stored in the storage unit. The degree of jam is classified every condition of collection of traffic information. And the navigation device performs setting step which sets conditions of collection, reading step which reads out from the storage unit statistical data corresponding to the conditions of collection, out of the statistical data of the respective links in the map data displayed on a display device, and degree of jam displaying step which displays a degree of jam every time zone of the respective links specified by the statistical data thus read overlappingly on the map displayed on the display device.

In this manner, with the use of statistical data of respective links matched with a condition of collection, it is possible to divide and display the tendency of jam on roads in more detail. Also, since the degree of jam every time zone indicated by the statistical data of links is overlapped and displayed on the links on the map, it becomes easy to grasp a change in road jam due to a change in time zone.

Also, in a second aspect of the traffic information display method according to the present invention, map data including link data of respective links constituting roads on a map is stored in a storage unit of a navigation device having a current position detecting function. Also statistical data including the degree of jam of the respective links determined by statistical values of traffic information collected in the past. And the navigation device performs present status data obtaining step which obtains present status data including a degree of jam determined by present traffic information of respective links located in a peripheral region of the current position detected by the current position detecting function, from outside, degree of jam determining step which determines a degree of jam in respective links in the map data displayed on the display device by the use of present status data for links located in the peripheral region of the current position and statistical data for links located outside the peripheral region of the current position, and degree of jam displaying step which displays a degree of jam in the respective links determined in the jam degree determining step overlappingly on the map displayed on the display device.

Thus the degree of jam on respective roads is displayed by the use of present status traffic information (present status data) for a periphery of a current position in which it is less possible that the situation will change from the present traffic information even when a user reaches there, and traffic information (statistical data) collected in the past for a region except the periphery of the current position in which it is possible that the situation will change from the present traffic information when a user reaches there. Accordingly, it is possible to display the degree of jam on roads in view of the possibility that a user encounters such jam.

BRIEF DESCRIPTION OF THE DRAWINGS

FIG. 4 is a view showing an example of a configuration of a second conversion table which specifies a day type on the basis of date;

DETAILED DESCRIPTION OF THE PREFERRED EMBODIMENTS

First Embodiment

A first embodiment according to the present invention will be described hereinafter with reference to the accompanying drawings.

Figure 1:
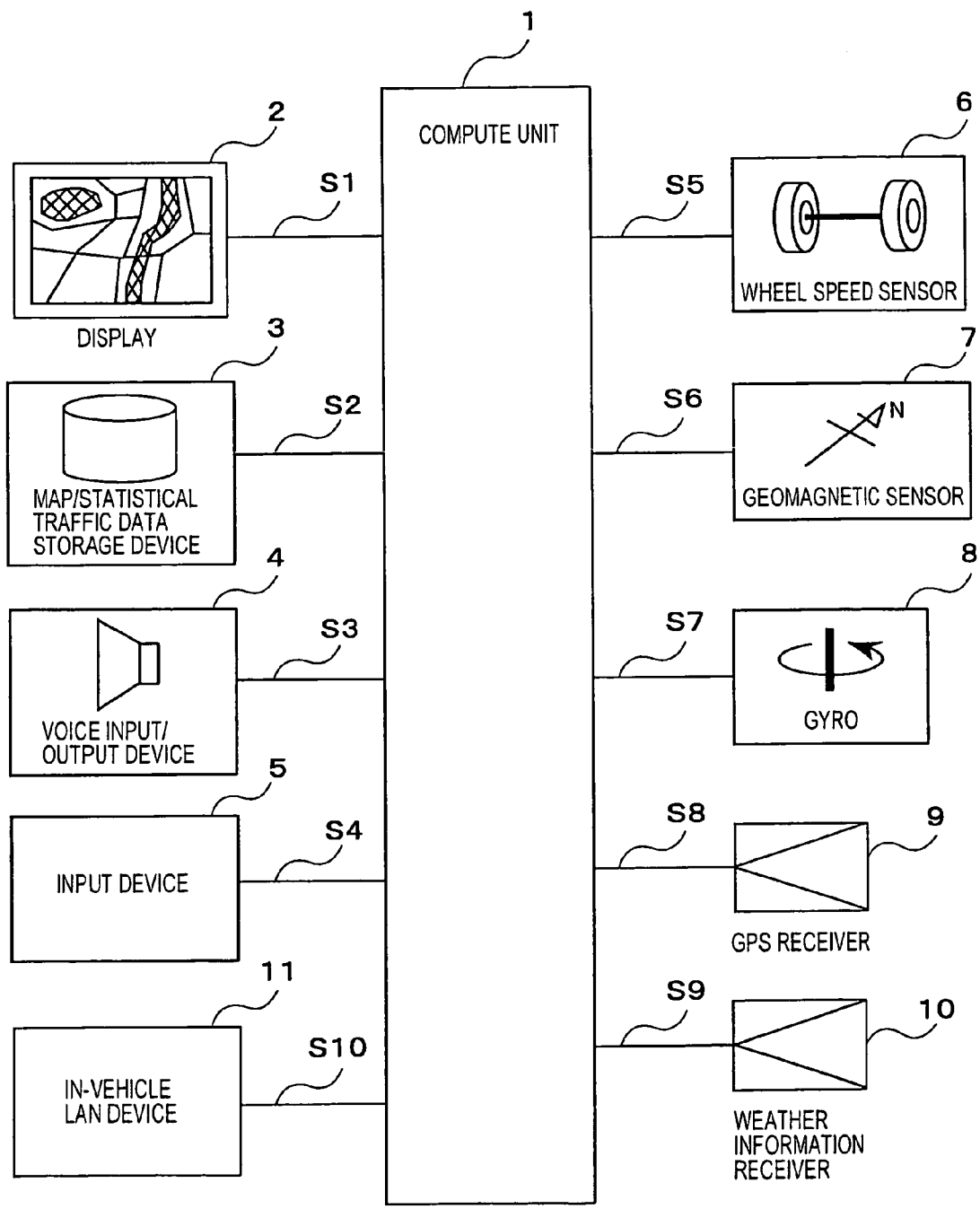
FIG. 1 is a diagram showing a schematic configuration of an in-vehicle type navigation device to which a first embodiment according to the present invention is applied.

FIG. 1 is a diagram showing a schematic configuration of an in-vehicle type navigation device to which the first embodiment according to the present invention is applied.

As shown in FIG. 1, the in-vehicle type navigation device according to this embodiment comprises a compute unit 1, a display 2, a map/statistical traffic data storage device 3, a voice input/output device 4, an input device 5, a wheel speed sensor 6, a geomagnetic sensor 7, a gyro sensor 8, a GPS (Global Positioning System) receiver 9, a weather information receiver 10, and an in-vehicle LAN device 11.

The compute unit 1 is a central unit which performs various processing. For example, it detects a current position on the basis of information output from various sensors 6 to 8 and the GPS receiver 9, and reads out map data required for display from the map/statistical traffic data storage device 3 on the basis of the current position information thus obtained. Further, it develops the map data thus read out into graphics, overlaps the developed graphics with a current position mark and displays the result on the display 2. And it searches an optimum route (recommended route) connecting a destination and a departure position (for example, a current position) indicated by a user by using map data and statistical traffic data stored in the map/statistical traffic data storage device 3 and guides the user by using the voice input/output device 4 and the display 2.

The display 2 is a unit which displays the graphics information generated by the compute unit 1, and it comprises a CRT or liquid crystal display. Further, it is common practice for RGB signals or NTSC (National Television Standards Committee) signals to be used as singles S1 between the compute unit 1 and the display 2.

The map/statistical traffic data storage device 3 comprises a storage medium such as a CD-ROM, a DVD-ROM, a HDD or an IC card. In the storage medium, map data and statistical traffic data are stored.

Figure 2:
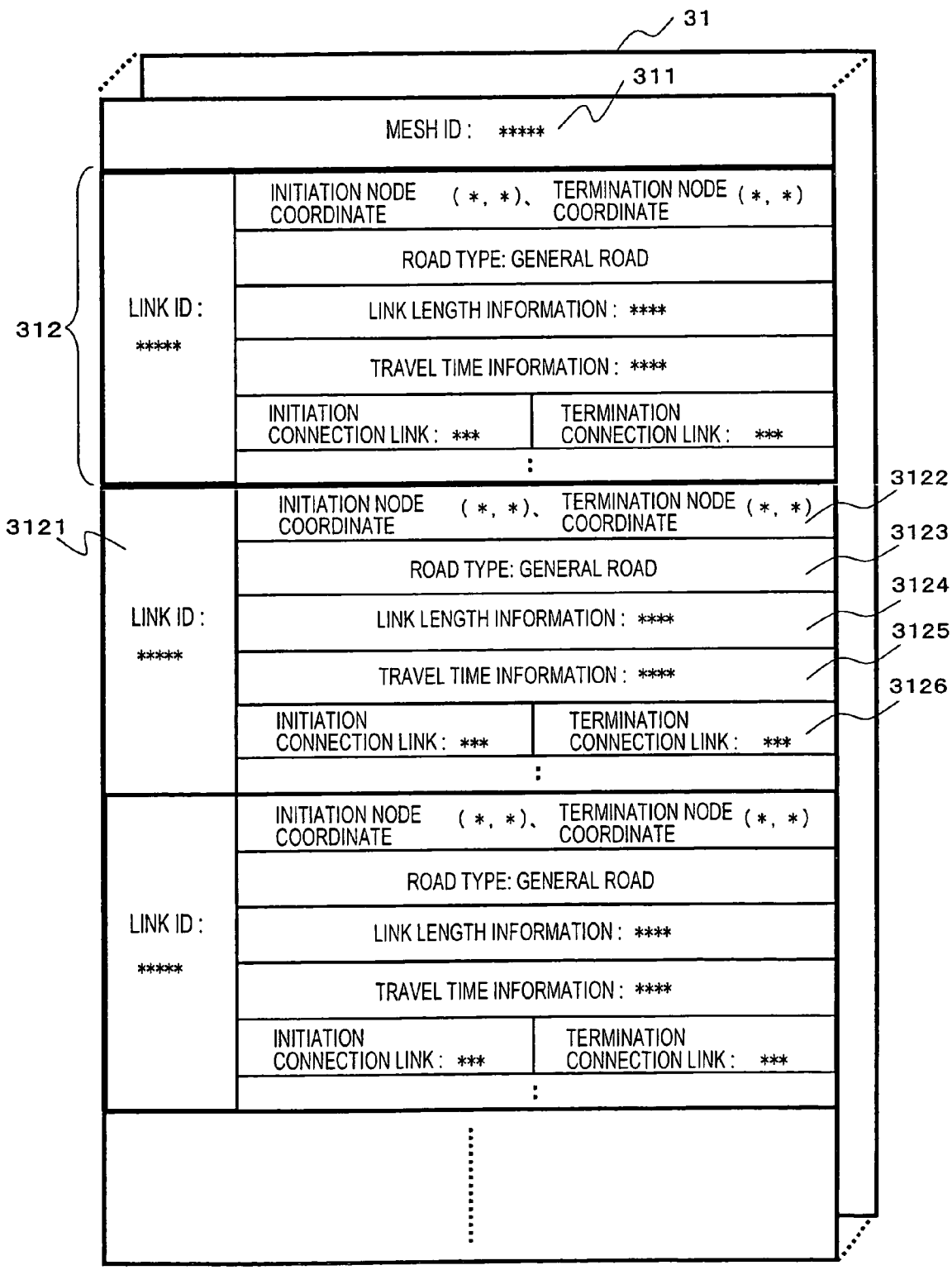
FIG. 2 is a view showing an example of a configuration of map data stored in a map/statistical traffic data storage device 3.

FIG. 2 is a view showing an example of a configuration of map data stored in the map/statistical traffic data storage device 3. As shown in FIG. 2, map data 310 is stored every mesh area obtained by dividing a map into a plurality of sections. The map data 310 comprises an identification code (mesh ID) 311 of a mesh area, and link data 312 of respective links constituting roads included in the mesh areas. The link data 312 comprises a link identification code (link ID) 3121, coordinate information 3122 of two nodes (initiation node, termination node) constituting the link, road type information 3123 of a road including the links, link length information 3124 indicating ling length of the link, link travel time (or moving speed) information 3125 of the link, and link ID (connection ID) 3126 of links connecting to the two nodes, etc. In addition, by distinguishing between the initiation node and the termination node for the two nodes constituting the links, up and down directions of the same road, respectively, are managed as separate links. Further, the map data 310 comprise information (designation, type, coordinate information, etc.) of map constituents outside the roads included in corresponding mesh areas.

Figure 3:
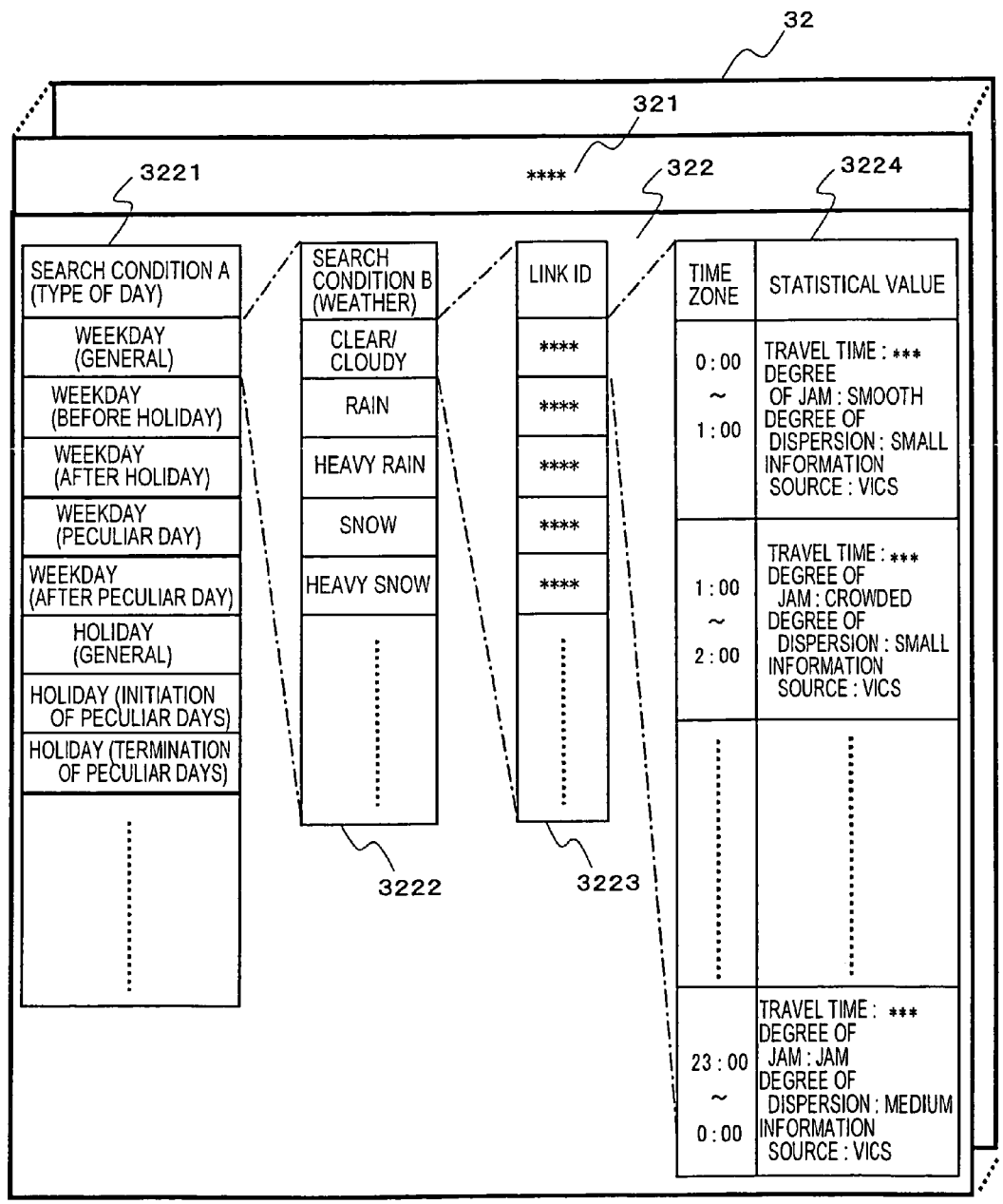
FIG. 3 is a view showing an example of a configuration of statistical traffic data stored in the map/statistical traffic data storage device 3.

FIG. 3 is a view showing an example of a configuration of statistical traffic data stored in the map/statistical traffic data storage device 3. As shown in FIG. 3, statistical traffic data 320 is stored every mesh area described above. The statistical traffic data 320 comprises mesh ID 321 of mesh area, and management data 322 for managing traffic information statistical values (statistical values of traffic information collected in the past) of respective links constituting the roads included in the mesh areas. The mesh ID 321 which is the same as mesh ID 311 of the map data 310 is used. The management data 322 comprises a plurality of tables 3221 to 3224 having the hierarchy structure.

The table 3221 is one which registers the day type. The day type is preferably decided every unit at which traffic information statistical values have a tendency to differ. Here, weekdays before holidays "weekdays (before holidays)", weekdays after holidays "weekdays (after holidays)", weekdays before peculiar days such as Christmas or the like "weekdays (before peculiar days)", weekdays after peculiar days "weekdays after peculiar days", other weekdays "weekdays (common)", a first day of peculiar days "holiday (beginning of peculiar days)", a last day of peculiar days "holiday (end of peculiar days)", and other holidays "holidays (common)" are used as the type of days.

The table 3222 is one which registers a weather type, and is provided every day type registered in the table 3221. The weather type is preferably decided every unit at which traffic information statistical values have a tendency to differ. Here, "clear/cloudy", "rainy", "heavily rainy", "snow", and "heavy snow" are used as the types of weather.

The table 3223 is one which registers a link ID of each link constituting roads included in mesh areas identified by the mesh ID 321, and is provided every weather type registered in the table 3223. The link ID which is the same as link ID 3121 of the map data 310 is used.

The table 3224 is one which registers traffic information statistical values every time zone, and is provided every link ID registered in the table 3223. The traffic information statistical values every time zone include link travel time (or moving speed), degree of dispersion (dispersion) in link travel time (or moving speed), and degree of link jam, which are specified by plural traffic information being an origin of the values, and an information source (VICS and the like) of the plural traffic information being the origin. Further, the traffic information statistical values every time zone are classified according to the collection condition of the traffic information being an origin (a day type and a weather type in which traffic information being an origin is collected) and a link under consideration. That is, the link under consideration for the traffic information statistical values every time zone which are registered in the table 3224 is one specified by a link ID in the table 3223 corresponding to the table 3224, and traffic information being an origin of the statistical values is one collected in a weather specified by the weather type in the table 3222 corresponding to the table 3223 in which the link ID is registered, and a day specified by the day type in the table 3221 corresponding to the table 3222 in which the weather type is registered.

In addition, as described above, the traffic information statistical values include degree of link jam (in FIG. 3, three levels of jam, confusion, and smoothness) Generally, in order to calculate the degree of jam, it is necessary to compare speed limits of respective links with moving speeds (calculated from link length and travel time) obtained from the traffic information statistical values. By beforehand having the degree of jam in the traffic information statistical values, degrees of jam for respective links can be determined without the use of speed limit information of the respective links, so that it is not necessary for link data to include the speed limit information. Thereby, the link data can be reduced in data size.

Further, the traffic information statistical values include an information source of the plural traffic information being an origin of the values. By having the information source in the traffic information statistical values to be used for displaying, the probability of the traffic information statistical values cay be judged by a user.

Further, the traffic information statistical values include the degree of dispersion (dispersion) in link travel time which is specified by the plural traffic information being an origin of the values. By beforehand having the degree of dispersion in the traffic information statistical values to be used for displaying, the reliability of link travel time which is specified by the traffic information statistical values cay be judged by a user.

In addition, the map/statistical traffic data storage device 3 stores a conversion table (referred to as a first conversion table) which specifies a mesh ID of a mesh area including a point specified by the coordinate information. Further, the map/statistical traffic data storage device stores a conversion table (referred to as a second conversion table) which specifies a day type managed by the table 3221 on the basis of the date.

FIG. 4 is a view showing an example of a configuration of the second conversion table. As shown in FIG. 4, a date 331 and a day type are matched to be registered in the second conversion table. The second conversion table is used to enable simply specifying a day type on the basis of the date. For example, in case where software installed into the in-vehicle type navigation device executes the processing of specifying a day type on the basis of the date through the calculation logic, the software must be rewritten in order to further subdivide the classification of day type. Also, the specific processing for peculiar days such as the year-end and Christmas becomes complicate. In this respect, since the embodiment adopts the conversion table as shown in FIG. 4, only exchange of a CD-ROM and a DVD-ROM which constitute map/statistical traffic data storage device 3 can meet with subdivision of the classification without modification of the software installed into the in-vehicle type navigation device. Further, no complicate processing needs for specifying a day type when peculiar days can be specified from the conversion table.

An explanation is given returning to FIG. 1. The voice input/output device 4 converts to a voice signal a message which is generated for a user by the compute unit 1, and recognizes a user's voice and transmits the content to the compute unit 1.

The input device 5 receives an instruction from the user, and a scroll key, a hard switch such as a scroll key, a scale alternation key, a joy stick key, and a touch panel on a display or the like are used as the input device 5.

The sensors 6 to 8 and the GPS receiver 9 are used to detect a current position (vehicle position) by the in-vehicle type navigation device. The wheel speed sensor 6 calculates a travel distance from the produce of a circumference of a wheel and the number of rotations of the wheel, and calculates an angle, at which a vehicle turns, from a difference of the number of rotations between a pair of wheels. The geomagnetic sensor 7 detects the magnetic field inherent to the earth to detect a direction in which a vehicle faces. The gyro 8 detects an angle at which the vehicle turns. As an optical fiber gyro, a vibration gyro or the like are used as the gyro 8. The GPS receiver 9 receives a signal from three or more GPS satellites and measures distances between the vehicle and each of the GPS satellites and change rates of the distances, to measure a current position, a travel direction and a travel azimuth of the vehicle.

The in-vehicle LAN device 11 receives various information on a vehicle on which the in-vehicle type navigation device according to the embodiment is mounted, such as door opened/closed information, a status of a turn-on lamp, a status of an engine, a trouble diagnosis result, etc.

The weather information receiver 10 obtains weather information from a meteorological center which provides service of weather information by the use of an FM multiplexing broadcasting. Here, the weather information includes information of mesh ID (the same as mesh ID 311 of the map data 310) included in an object region, the type of weather in the object region (the type registered in table 3222 of the statistical traffic data 320), and a time zone (object time zone) during which the weather continues.

Instead of providing the weather information receiver 10, there may be provided means which receives the status of operation of a wiper on a vehicle which the in-vehicle type navigation device according to the embodiment is mounted, and receives through the in-vehicle LAN device 11 a detection value of an outside air temperature sensor mounted on the vehicle to determine the weather on the basis of the received result.

Figure 5:
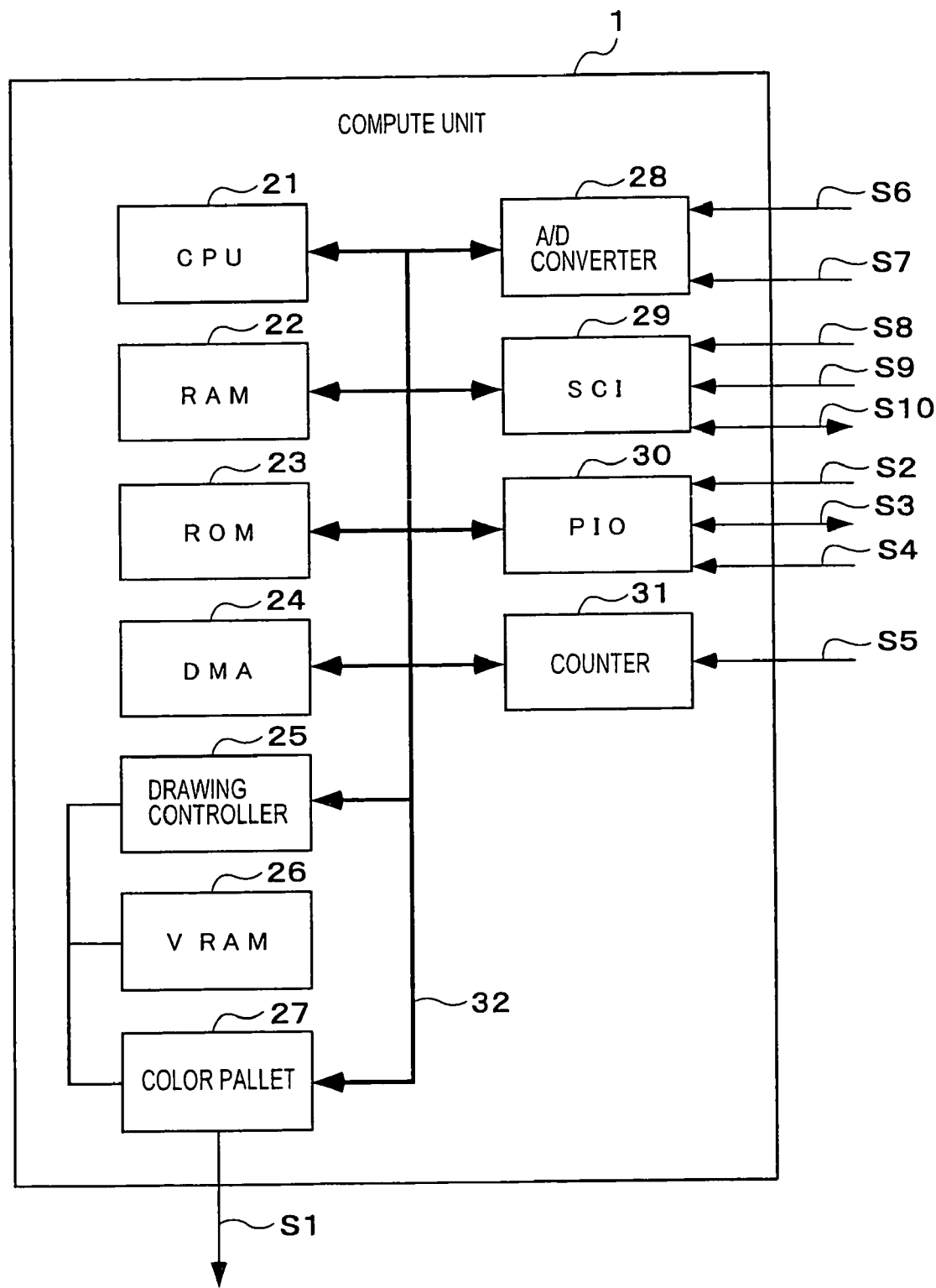
FIG. 5 is a diagram showing the hardware configuration of a compute unit 1.

FIG. 5 is a diagram showing the hardware configuration of the compute unit 1.

As shown in FIG. 5, the compute unit 1 has such a structure that various devices are connected to one another through a bus 32. The compute unit 1 comprises a CPU (Central Processing Unit) 21 which performs various processing such as controlling the numerical calculation and each device, a RAM (Random Access Memory) 22 which stores calculation data, map data and statistical traffic data which are read out from the map/statistical traffic data storage device 3, a ROM (Read Only Memory) 23 which stores programs and data, a DMA (Direct Memory Access) 24 which performs data transmission between memories and between each memory and each device, a drawing controller 25 which performs graphics drawing and also performing display control, a VRAM (Video Random Access Memory) 26 which stores graphics image data, a color pallet 27 which converts image data to RGB signals, an A/D converter 28 which converts analog signals to digital signals, a SCI (Serial Communication Interface) 29 which converts serial signals to parallel signals which are synchronized with the bus, a PIO (Parallel Input/Output) 30 which inputs the parallel signals on the bus in synchronism with the bus, and a counter 31 which integrates pulse signals.

Figure 6:
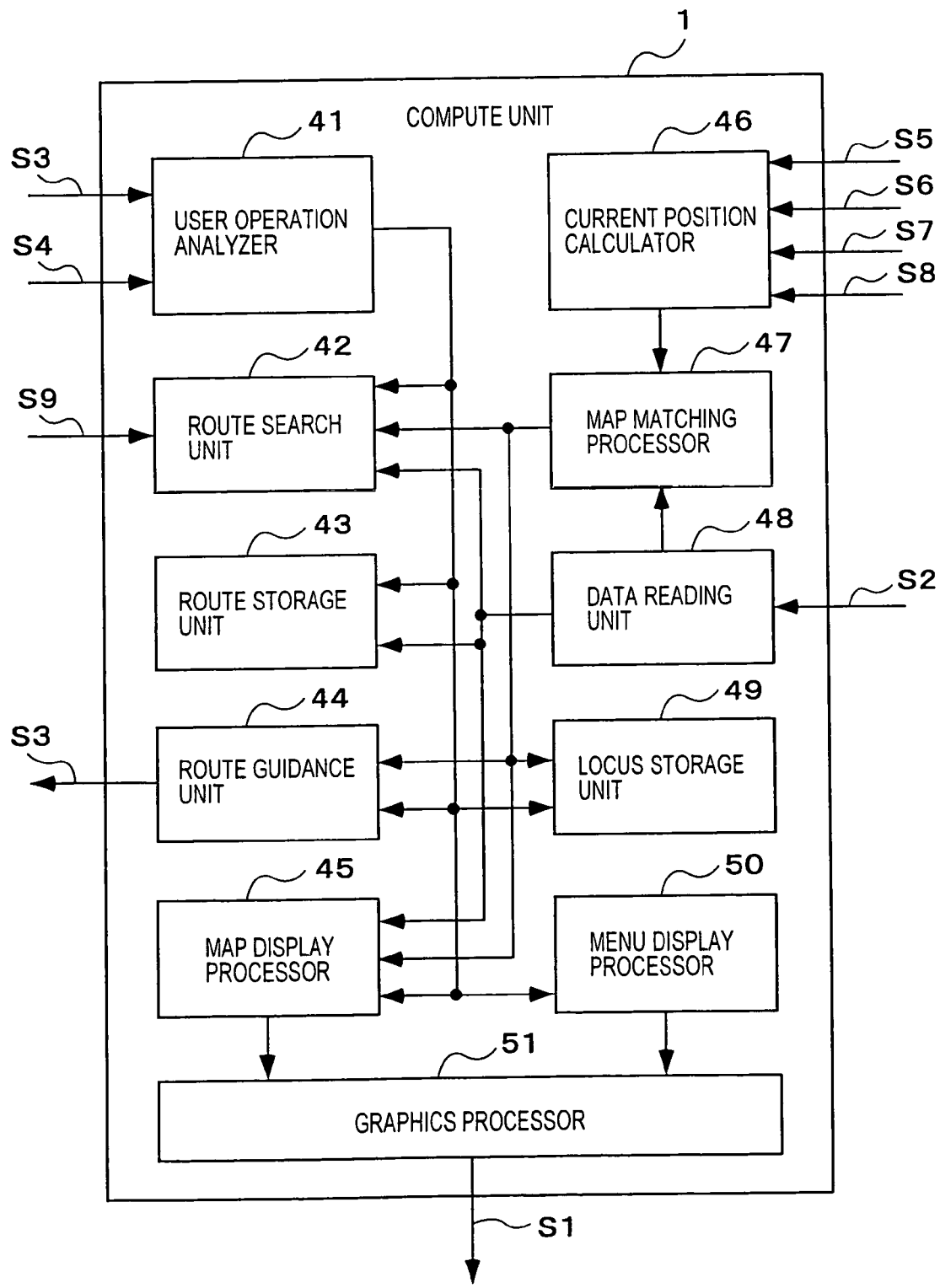
FIG. 6 is a diagram showing the functional configuration of the compute unit 1.

FIG. 6 is a diagram showing the functional configuration of the compute unit 1.

As shown in FIG. 6, the compute unit 1 comprises a user operation analyzer 41, a route search unit 42, a route storage unit 43, a route guidance unit 44, a map display processor 45, a current position calculator 46, a map matching processor 47, a data reading unit 48, a locus storage unit 49, a menu display processor 50, and a graphics processor 51.

By using distance data and angle data which are obtained by integrating distance pulse data S5 measured by the wheel speed sensor 6 and angular acceleration data S7 measured by the gyro 8, respectively, the current position calculator 46 performs processing of integrating the distance data and the angle data on the time axis to periodically calculate the current position (X', Y') after the vehicle runs from an initial position (X, Y) and outputs the current position to the map matching processor 47. Here, in order to achieve coincidence between an angle at which the vehicle turns and a travel azimuth of the vehicle, an absolute azimuth in the travel direction of the vehicle is estimated by referring to azimuth data S6 obtained from the geomagnetic sensor 7 and angle data obtained by integrating the angular acceleration data S7 obtained from the gyro 8. Since errors are gradually accumulated as the data of the wheel speed sensor 6 and the data of the gyro 8 are respectively integrated, the processing of canceling the accumulated errors on the basis of position data S8 obtained from the GPS receiver 9 is performed periodically, and the current position information is output to the map matching processor 47.

The map matching processor 47 performs map matching processing for collating a travel locus stored in the locus storage unit 49 described later with map data surrounding the current position which are read by the data reading unit 48 to set the current position output from the current position calculator 46 onto a road having the highest correlation in shape. Since the current position information obtained by the current position calculator 46 includes sensor errors, map matching processing is performed for the purpose of enhancing the positional accuracy. Accordingly, the current position is set to be coincident with the running road in many cases.

The locus storage unit 49 stores as locus data the current position information which has been subjected to the map matching processing in the map matching processor 47 every time the vehicle runs for a predetermined distance. The locus data is used to draw a locus mark on a road which is located on the corresponding map and on which the vehicle has run.

The user operation analyzer 41 receives a user's request input into input device 5 to analyze the content of the request. It controls various constituent parts of the compute unit 1 so that a processing corresponding to the content of the request is performed. For example, when the user requests to search a recommended route, the user operation analyzer 41 requests the map display processor 45 to perform a processing of displaying a map on the display 2 for the purpose of setting a departure position and a destination, and further requests the route search unit 42 to perform a processing of calculating a route from the departure position to the destination.

The route search unit 42 searches a route (route of the minimum cost (travel time)), through which the vehicle can reach a destination in the shortest time, out of routes connecting two specified points (the departure position and the destination) by using the Dijkstra method or the like from map data, and stores the searched route as a recommended route in the route storage unit 43. In the embodiment, in order to calculate the cost for a route connecting two points, there are used statistical traffic data stored in the map/statistical traffic data storage device 3, that is, traffic information statistical values classified every condition such as the day type, the weather type, etc., and every time zone of respective links (see FIG. 3).

The route guidance unit 44 compares information of a recommended route stored in route storage unit 43 with the current position information output from the map matching processor 47, and informs a user of a recommended route with voice using the voice input/output device 4 whether a vehicle should go straight on or turn to the right or left before passing a crossing, and/or by indicating a travel direction on a map displayed on the display 2.

Further, the route guidance unit 44 calculates an expected travel time from the current position output from the map matching processor 47 to the destination by using the current time and statistical traffic data stored in the map/statistical traffic data storage device 3. Further, it adds the expected travel time thus calculated to the current time to calculate an expected point of time for arrival at the destination, and informs the user of the time.

Further, the route guidance unit 44 measures an actual travel time required from the departure position of the recommended route to the current position output from the map matching processor 47. Further, it compares the actual travel time with cost (travel time) for a section between the departure position and the current position, out of cost used by the route search unit 42 in searching the recommended route, and judges the need of searching a recommended route again in accordance with the result of comparison. When the need of searching a recommended route again is determined, the route guidance unit 44 requests the route search unit 42 to search a recommended route again with the current position output from the map matching processor 47 as a departure position.

The data reading unit 48 operates to read from the map/statistical traffic data storage device 3 map data and statistical traffic data in an area which is requested to be displayed on the display 2 or in an area which is requested for the purpose of searching a route (an area covering a departure position and a destination).

The map display processor 45 receives from the data reading unit 48 map data in an area which is requested to be displayed on the display 2, and generates map drawing commands so that the graphics processor 51 can draw a road, other map constituents, a current position, a destination, and marks such as arrows for a recommended route in an instructed scale and in an instructed drawing mode. Further, it receives commands output from the user operation analyzer 41 to receive from the data reading unit 48 statistical traffic data which are requested to be displayed on the display 2, and generates map drawing commands so that traffic information statistical values of respective roads are displayed overlap one another on a map displayed in the display 2.

The graphics processor 51 receives a command output from the user operation analyzer 41, and generates menu drawing commands so that the graphics processor 51 draws various types of menus and graphs.

The graphics processor 51 receives commands generated in the map display processor 45 and the menu display processor 50 so that image data to be displayed on the display 2 are developed into an image in the VRAM 26.

The operation of the in-vehicle type navigation device constructed in the above manner will be described hereinafter.

First, the recommended route search operation will be described.

Figure 7:
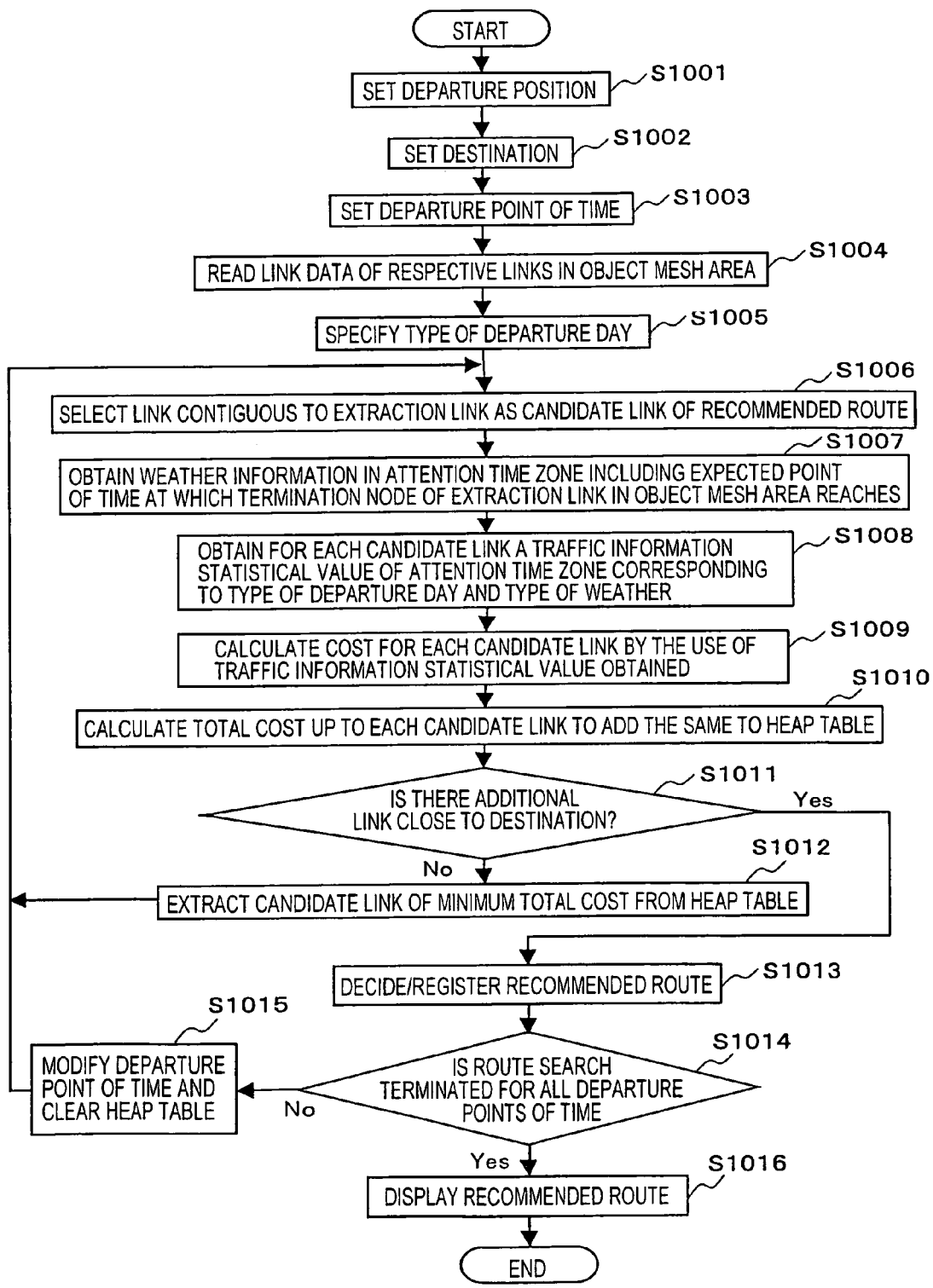
FIG. 7 is a flowchart showing a recommended route search operation of the in-vehicle type navigation device to which the first embodiment of the invention is applied.

FIG. 7 is a flowchart showing the recommended route search operation of the in-vehicle type navigation device to which the first embodiment of the invention is applied. The flow is started when the user operation analyzer 41 receives a user's request of searching a recommended route through the voice input/output device 4 or the input device 5.

First, the user operation analyzer 41 sets a departure position, a destination, and a departure point of time in the route search unit 42 (S1001 to S1003).

Here, the user operation analyzer 41 may display information of map constituents registered in the map data read out through the data reading unit 48 from the map/statistical traffic data storage device 3 on the display 2 through the menu display processor 50 and the graphics processor 51, and a user may select a departure position and a destination which are set, out of the information of map constituents on the display through the voice input/output device 4 or the input device 5. Alternatively, information of positions (registered positions) beforehand registered in a storage device such as a RAM 22 or the like by the user may be displayed, and the user may select a departure position and a destination out of the information of the registered positions as displayed through the voice input/output device 4 or the input device 5. Further, the user operation analyzer 41 may display a map specified by the map data read out through the data reading unit 48 from the map/statistical traffic data storage device 3 on the display 2 through the map display processor 45 and the graphics processor 51, and may receive an instruction of a position on the map from the user through the voice input/output device 4 or the input device 5 to select a departure position and a destination.

In addition, in the case where a current position is set as a departure position, instruction of a departure position by the user may be omitted. Further, also in the case where the current time is set as a departure point of time, instruction of a departure point of time by the user may be omitted. In the embodiment, it is possible to set plural departure points of time. For example, in the case where it is instructed through the voice input/output device 4 or the input device 5 by the user to set plural departure points of time, the user operation analyzer 41 sets plural departure points of time at an interval of a predetermined period of time with the current time or a point of time instructed by the user as a first departure point of time.

And when a departure position, a destination, and a departure point of time are set in the route search unit 42 in the above manner, the user operation analyzer 41 issues a route search instruction to the route search unit 42.

Receiving the route search instruction, the route search unit 42 reads out the first conversion table which specifies a mesh ID of a mesh area including a point specified by the coordinate information, from the map/statistical traffic data storage device 3 through the data reading unit 48. Then the route search unit 42 uses the first conversion table to specify mesh IDs of respective mesh areas included in areas including a departure position and a destination which have been set. Then the route search unit 42 obtains respective link data 312 registered in the respective map data 310 having the specified mesh IDs from the map/statistical traffic data storage device 3 through the data reading unit 48 (S1004). Next, the route search unit 48 reads out the second conversion table which specifies a day type managed by the table 3221 of the statistical traffic data 320 on the basis of the date, from the map/ statistical traffic data storage device 3 through the data reading unit 48. And the route search unit 48 uses the second conversion table to specify a day type of today (departure day) (S1005)

In the case where the date of a departure day is not registered in the second conversion table, a day type corresponding to the departure day may be specified by using the software installed into the in-vehicle type navigation device to perform the processing of specifying a day type of the departure day on the basis of the date through the calculation logic. Thus the processing can be continued and implemented even in the case where a range of a date registered in the second conversion table is exceeded.

Next, the route search unit 42 uses the link data 312 readout from the map/statistical traffic data storage device 3 in S1006 to select links, in each of which a termination node of a link (referred to as an extraction link) extracted from a heap table in S1012 described later is made its initiation node, as candidates of links (referred to as candidate links) constituting a recommended route. In the case where the processing in S1012 is not performed, that is, in the initial stage in which no link is registered in the heap table, however, the route search unit 42 selects at least one link on which a departure position is located, or which is close to the departure position as the candidate link instead of selecting links whose initiation node are the termination node of the extraction link as the candidate links (S1006).

Here, the heap table is one which registers link data of the candidate link together with a total cost (total travel time) needed until the termination node of the candidate link from the departure position, and the heap table is stored in a storage device such as a memory or the like.

Next, the route search unit 42 calculates an expected point of time at which the termination node of the extraction link is reached. The expected point of time can be calculated by adding to the departure point of time the total cost (total travel time) of the extraction link registered in the heap table. Further, the route search unit 42 uses the first conversion table to specify a mesh ID of a mesh area in which the termination node of the extraction link is located. In the case where the processing in S1012 is not performed, that is, in the initial stage in which no link is registered in the heap table, however, the route search unit 42 specifies a mesh ID of a mesh area in which the departure position is located. Then the route search unit 42 obtains weather information comprising the specified mesh ID and an object time zone (referred to as an attention time zone) to which an expected point of time at which the termination node of the extraction link is reached belongs, through the weather information receiver 10 from a meteorological center providing service of weather information (S1007).

In the case where there is provided means which judges weather on the basis of status information of the operation of a wiper received through the in-vehicle LAN device 11 and outside air temperature information, the weather information judged by the means may be obtained in place of the weather information receiver 10.

Next, the route search unit 42 has access through the data reading unit 48 to the statistical traffic data 320 having the mesh ID specified in S1007 in the map/statistical traffic data storage device 3. Then using the management data 322 of the statistical traffic data 320, the route search unit 42 obtains for each of candidate links a traffic information statistical value being one of the attention time zone and corresponding to the day type specified in S1005 and a weather type specified by the weather information obtained in S1007 (S1008).

Then the route search unit 42 finds for each of candidate links the cost (travel time) of the candidate link by the use of the traffic information statistical value obtained in S1008 (S1009). In the case where the travel time is included in the traffic information statistical value, it is made the cost. In the case where a moving speed is included in place of the travel time, the route search unit 42 calculates the travel time of the link as the cost by using the moving speed and a link length specified by the link data. In addition, in the case where there is a candidate link for which a traffic information statistical value cannot be obtained in S1008, travel time included in the link data 312 of the candidate link, or travel time of the link calculated by the use of a moving speed and a link length included in the link data is made the cost of the candidate link.

Next, the route search unit 42 calculates the total cost (total travel time needed until the termination node of the candidate link from the departure position) of each of candidate links. Concretely, the cost of the candidate link calculated in S1009 is added to the total cost of the extraction link registered in the heap table, and the result of addition is made the total cost of the candidate link. In the initial stage in which no extraction link is registered in the heap table, however, the cost of the candidate link calculated in S1009 is made the total cost of the candidate link. Then the route search unit 42 adds the link data and the total cost of each of candidate links to the heap table (S1010).

Next, the route search unit 42 investigates whether a link (referred to as a destination link) on which the destination is located or which closes to the destination is provided in links newly added to the heap table in S1010 which is performed just before (S1011).

When it is judged in S1011 that any destination link is not existent, the route search unit 42 extracts a non-extracted link having a minimum total cost from the heap table as by sorting information of links registered in the heap table in the order of decreasing total cost and extracting a non-extracted link disposed initially (S1012). Then the procedure returns to S1006.

In contrast, when it is judged in S1011 that a destination link is existent, the route search unit 42 performs the processing of deciding a recommended route. Concretely, the route search unit 42 detects from the heap table a link which causes the destination link (a link whose termination node is the initiation node of the destination link), and decides the detected link as a link constituting a recommended route (referred to as a constituent link). Next, the route search unit 42 investigates whether the constituent link is a link on which the departure point is located or which closes to the departure point (referred to as a departure link). When the constituent link is not the departure link, the route search unit 42 detects a link which causes the constituent link to decide the detected link as a new constituent link and further investigates whether the new constituent link is the departure link. The route search unit 42 repeats the processing until the constituent link is judged to be the departure link, and decides respective constituent links constituting the recommended route. Then the route search unit 42 stores the link data 312 of respective constituent links constituting the recommended route and the traffic information statistical values which are obtained in S1008, as information of the recommended route at the set departure point of time in the route storage unit 43 (S1013).

When information of the recommended route at a certain departure point of time is registered in the route storage unit 43 in S1013, the route search unit 42 investigates with respect to all departure points of time (as described above, it is possible to set plural departure points of time) in S1003 whether information of the recommended route has been registered in the route storage unit 43. When all the information has not been registered (No in S1014), the route search unit 42 clears the content registered in the heap table, sets a departure point of time which is set in S1003 and for which the recommended route is not retrieved, as a departure point of time for which the recommended route should be subsequently retrieved (S1015), and returns to S1006. Meanwhile, when all the information has been registered (Yes in S1014), the route search unit 42 proceeds to S1016 to perform the recommended route display processing.

Through the above processing, travel time of respective constituent links constituting the recommended route becomes as follows. That is, travel time obtained from traffic information statistical values corresponding to a time zone including the departure point of time are used as travel time of a first link constituting the recommended route. Also, travel time obtained from traffic information statistical values corresponding to a time zone including an expected point of time at the termination node of a (n−1)th extraction link connecting to the (n)th link is used as travel time of a (n)th (n≧2) link constituting the recommended route.

Figure 8:
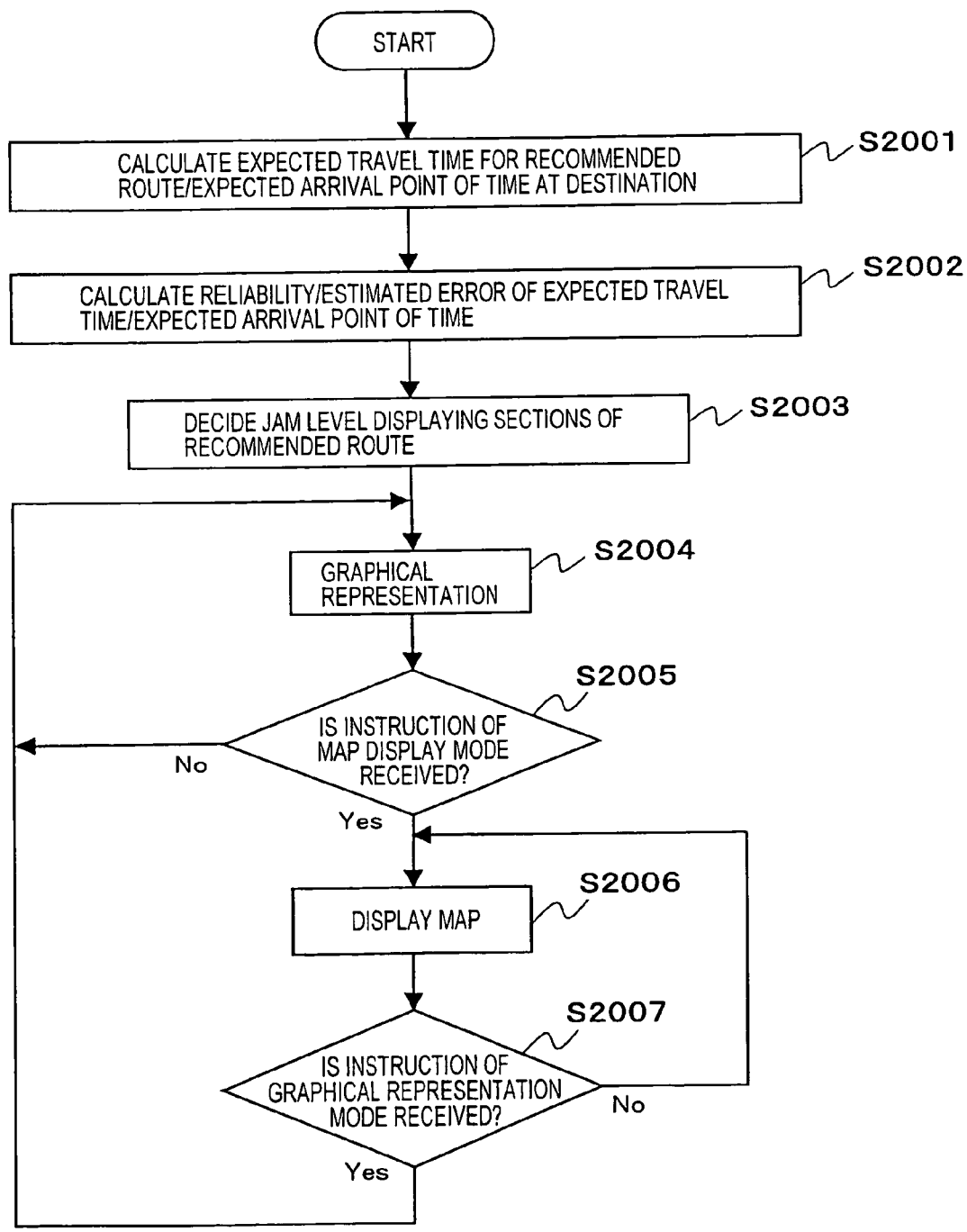
FIG. 8 is a flowchart illustrating a recommended route display processing in S1018 shown in FIG. 6.

FIG. 8 is a flow chart illustrating the recommended route display processing in S1016 shown in FIG. 7.

First, the route search unit 42 uses information of the recommended route registered in the route storage unit 43 to calculate an expected travel time for the recommended route and an expected arrival point of time at the destination (S2001).

Concretely, the route search unit 42 uses link data and traffic information statistical values of respective links constituting the recommended route, the link data and the traffic information statistical values being registered as information of the recommended route in the route storage unit 43, and calculates cost of the respective links in the same manner as in S1009 shown in FIG. 7. And the sum total of cost of the respective links constituting the recommended route is made an expected travel time up to the destination. Further, a point of time obtained by adding to a departure point of time the expected travel time is made an expected arrival point of time at the destination.

In the case where information of plural recommended routes being the same in departure position and destination but different in departure point of time is registered in the route storage unit 43, an expected travel time and an expected arrival point of time are found every plural recommended routes.

Next, the route search unit 42 calculates the reliability/estimated error of the expected travel time and the expected arrival point of time obtained in S2001 (S2002).

Concretely, using the degree of dispersion included in the traffic information statistical values of the respective links constituting the recommended route, the traffic information statistical values being registered as information of the recommended route in the route storage unit 43, the route search unit 42 calculates an error in the cost of the respective links constituting the recommended route obtained in S2001. For example, in the case where the degree of dispersion is "small", the relative error corresponds to 3%, in the case where the degree of dispersion is "medium", the relative error corresponds to 5%, and in the case where the degree of dispersion is "large", the relative error corresponds to 10%. Then the route search unit 42 multiplies the cost of the link by the relative error corresponding to the degree of dispersion of the link to calculate an error of the link. The processing is performed on the respective links constituting the recommended route. In addition, for links in which traffic information statistical values are not registered, the route search unit 42 multiplies the cost of the link by a predetermined relative error to calculate an error of the link. Here, it suffices that the predetermined relative error be made larger (for example, 15%) than relative errors of links in which traffic information statistical values are registered.

Next, the route search unit 42 calculates the total amount of errors of the respective links in cost and the total amount of errors is made estimated errors in the expected travel time and the expected arrival point of time. Further, the route search unit 42 calculates a rate (relative error) of an estimated error to the expected travel time and decides the reliability of the expected travel time and the expected arrival point of time according to the value of the rate. For example, when the rate is less than 5%, the reliability is determined to be "high", when the rate is within 5% to 10%, the reliability is determined to be "medium", and when the rate is more than 10%, the reliability is determined to be "low".

In addition, when the expected travel time and the expected arrival point of time are obtained every plural recommended routes in S2001, the reliability/estimated error of the expected travel time and the expected arrival point of time is obtained every plural recommended routes.

Next, the route search unit 42 decides jam level displaying sections of the recommended route and jam levels of the respective displaying sections (S2003). In the embodiment, the recommended route is divided into a plurality of sections (jam level displaying sections), and jam levels can be displayed in unit of section on the display 2. The processing of deciding the sections is performed in S2003.

The processing is performed, for example, in the following manner. That is, the route search unit 42 refers the degree of jam included in the traffic information statistical values of the respective links constituting the recommended route, and when adjacent links are in the same jam level, the route search unit 42 allots the both links to the same jam level displaying section. Then the route search unit 42 sets the sections to the same jam level.

Alternatively, the route search unit 42 refers the moving speeds included in the traffic information statistical values of the respective links constituting the recommended route, or the moving speeds obtained from the travel time and the link lengths included in the link data, and when the moving speeds of adjacent links belongs to the same moving speed zone out of plural moving speed zones as preset and road type and limit speeds included in the link data of the respective adjacent links are the same, the route search unit 42 allots the respective adjacent links to the same jam level displaying section. Then the route search unit 42 sets the section to a jam level according to a combination of the moving speed zone and the road type and a ratio of the moving speed zone and the limit speeds.

Alternatively, the route search unit 42 divides the recommended route every plural links and sets respective sections obtained as a result to jam level displaying sections. Then for the respective jam level displaying sections, the route search unit 42 calculate an average value of moving speeds included in the traffic information statistical values of respective links included in the section, or an average value of moving speeds obtained from an average value of travel time and the total amount of link lengths included in the link data of the plural links. Further, the route search unit 42 calculates an average value of limit speeds included in the link data of the plural links. Then, for the respective jam level displaying sections, the route search unit 42 sets jam level of the section to a jam level corresponding to a ratio of the average value of moving speeds and the limit speeds.

For links having no traffic information statistical value, the corresponding sections are dealt with as jam level displaying sections which are indefinite in jam level.

In addition, when the expected travel time and the expected arrival point of time are obtained every plural recommended routes in S2001, the route search unit 42 decides jam level displaying sections and jam levels of the respective displaying sections every plural recommended routes.

In the above manner, when the expected travel time/expected arrival point of time and the reliability/estimated error of the respective recommended routes, and the jam level displaying sections/the jam levels of the respective sections are decided, the route search unit 42 delivers to the menu display processor 50 such information together with the departure position, the destination, the departure points of time in the respective recommended routes, and the information source of traffic information statistical values included in the traffic information statistical values of the respective links of the respective recommended routes, and instructs the menu display processor 50 to display the recommended routes. Receiving the instruction, the menu display processor 50 graphically displays the recommended routes on the display 2 through the graphics processor 51 so that the expected travel time/the expected arrival point of time and the jam level displaying sections/the jam levels of the respective sections can be recognized. Further, the menu display processor 50 displays the reliability/estimated error of the recommended routes, and the information source of the traffic information statistical values used for calculation of the expected travel time/the expected arrival point of time (S2004).

Figure 9:
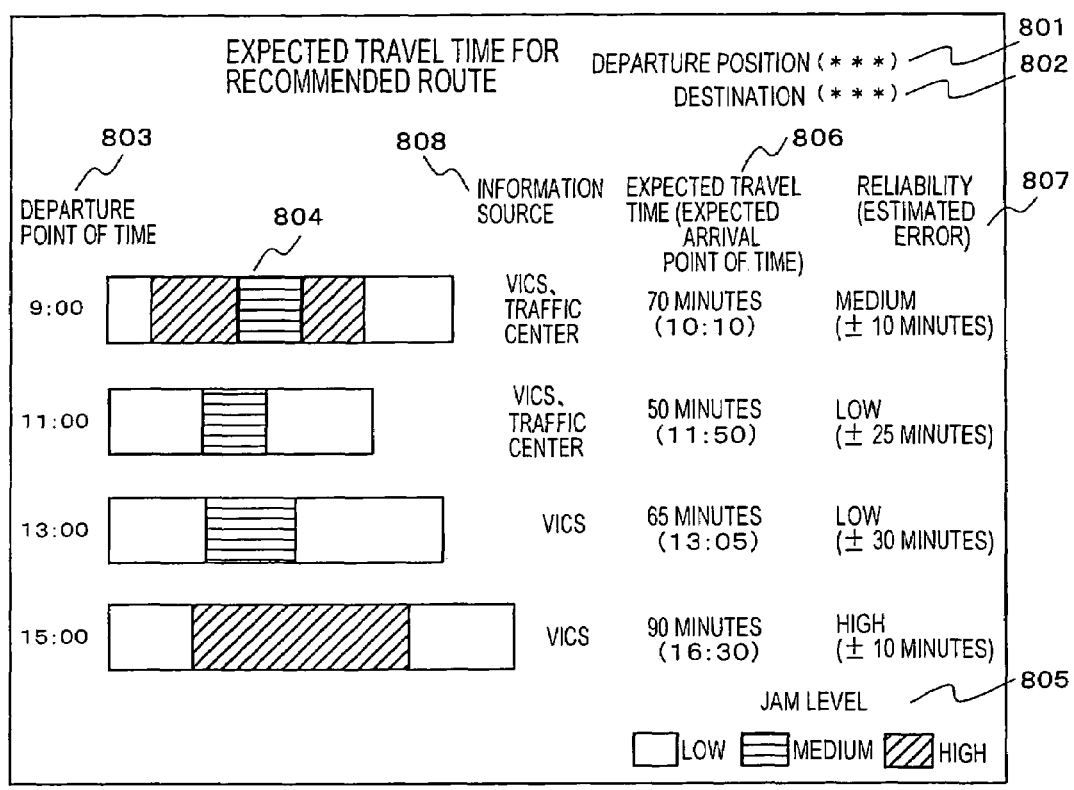
FIG. 9 is a view showing an example of graphical representation of recommended routes on a display 2.

FIG. 9 shows an example of graphical representation of recommended routes. This example illustrates a case where plural recommended routes being different in departure point of time 803 are represented for the same departure position 801 and the same destination 802. A length of a graph 804 of each of the recommended routes is in proportion to its expected travel time 806, and so the user can judge a departure point of time associated with a recommended route which is shortest in travel time.

Further, the graph 804 is composed of at least one jam level displaying section indicative a jam level 805, and a length of the displaying section is also in proportion to the travel time for the section. The user can judge the status of traffic congestion of the respective recommended routes by confirming a ratio of a jam level displaying section of high jam level in the graph.

Further, reliability (estimated error) 807 of the expected travel time (expected arrival point of time) is represented corresponding to expected travel time (expected arrival point of time) 806 of each of the recommended routes, and so the user can confirm what degree of error possibly has in the case where the recommended routes are used. Further, an information source 808 of the traffic information statistical values used for calculation of expected travel time (expected arrival point of time) is represented corresponding to the expected travel time (expected arrival point of time) 806 of each of the recommended routes. By referring the information source 808, the user can roughly judge reliability of the expected travel time (expected arrival point of time) 806.

In a state in which the recommended routes are graphically represented, when the user operation analyzer 41 receives a map display alteration instruction from the user through the voice input/output device 4 or the input device 5 (Yes in S2005), it informs the route search unit 42 of that. The route search unit 42 delivers to the map display processor 45 the expected travel time/the expected arrival point of time and the reliability/the estimated error of the respective recommended routes, and the jam level displaying sections/the respective sections together with the link data of the jam levels of the respective links constituting the recommended routes and stored in the route storage unit 43, and the information sources of the traffic information statistical values of the respective links included therein, and instructs the map display processor 45 to display the recommended routes.

Receiving the instruction, the map display processor 45 displays the recommended routes on the display 2 through the graphics processor 51 so that the jam level displaying sections/the jam levels of the respective sections can be recognized. Also, the map display processor 45 displays the expected travel time/the expected arrival point of time and the reliability/the estimated error of the recommended routes, and the information sources of the traffic information statistical values used for calculation of the expected travel time/ the expected arrival point of time (S2006)

Figure 10:
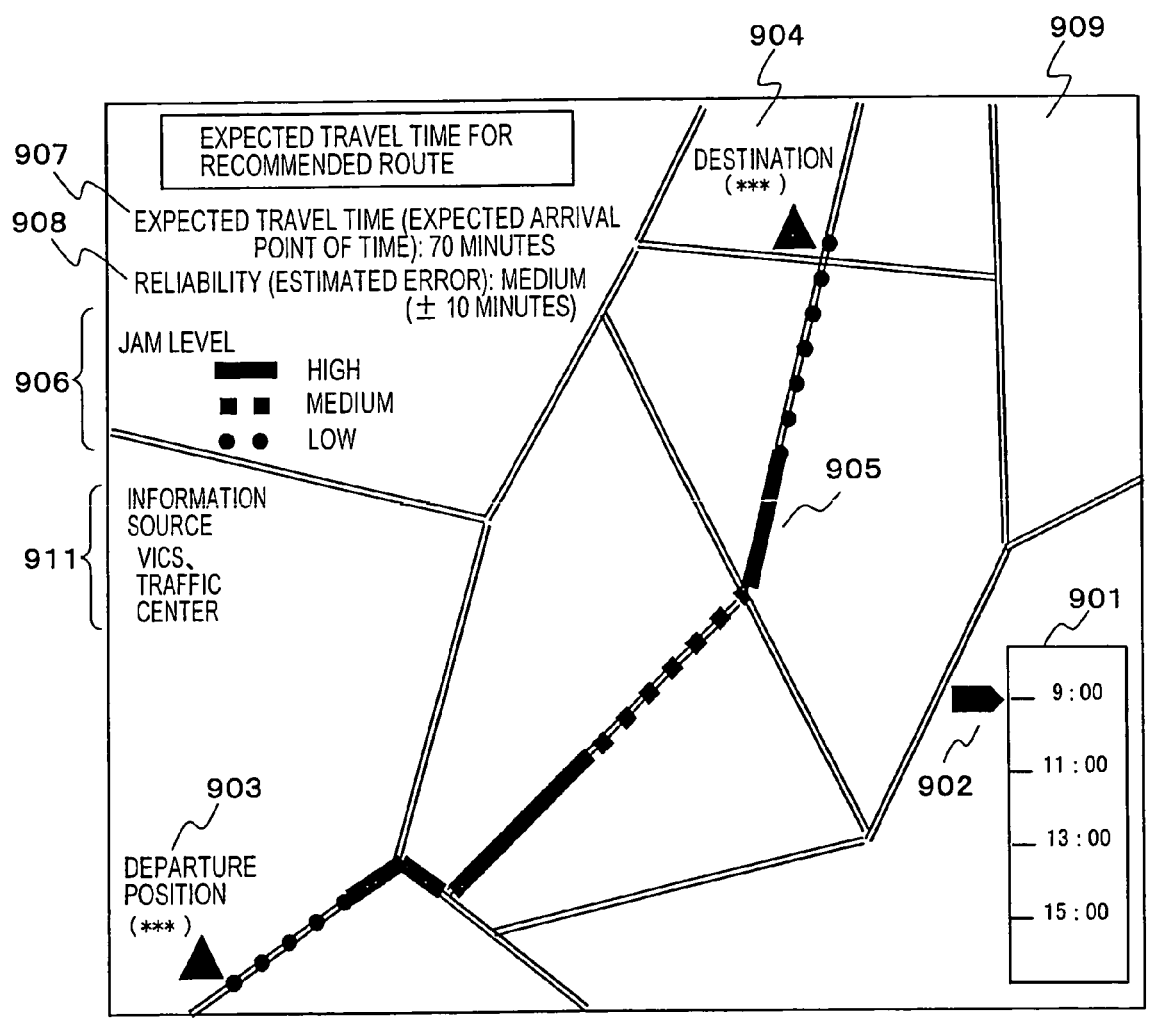
FIG. 10 is a view showing an example of a map display of a recommended route on the display 2.

FIG. 10 shows an example of a recommended route map display.

A recommended route 905 between a departure position 903 and a destination 904 is represented on a map 909 so that jam levels 906 in respective jam level displaying sections can be recognized. Also, in FIG. 10, a reference numeral 907 denotes the expected travel time (expected arrival point of time) for the destination, a reference numeral 908 denotes the reliability (estimated error) of the expected travel time (expected arrival point of time) 907, and a reference numeral 911 denotes the information sources of the traffic information statistical values used for calculation of the expected travel time (expected arrival point of time) 907. Further, a reference numeral 901 denotes a time display bar to receive an indication of a departure point of time from the user. Departure points of time for the respective recommended routes in the route guidance unit 44 are list displayed, in the time display bar 901. A user can operate a cursor 902 to display on the display 2 a recommended route for a desired departure point of time. In addition, the expected arrival point of time at the jam level displaying section (the expected arrival point of time at the termination node of the last link constituting a jam level displaying section just one before the jam level displaying section concerned) may be displayed every jam level displaying section so as to be coincident with a initiation position of the jam level displaying section on the map.

Figure 11:
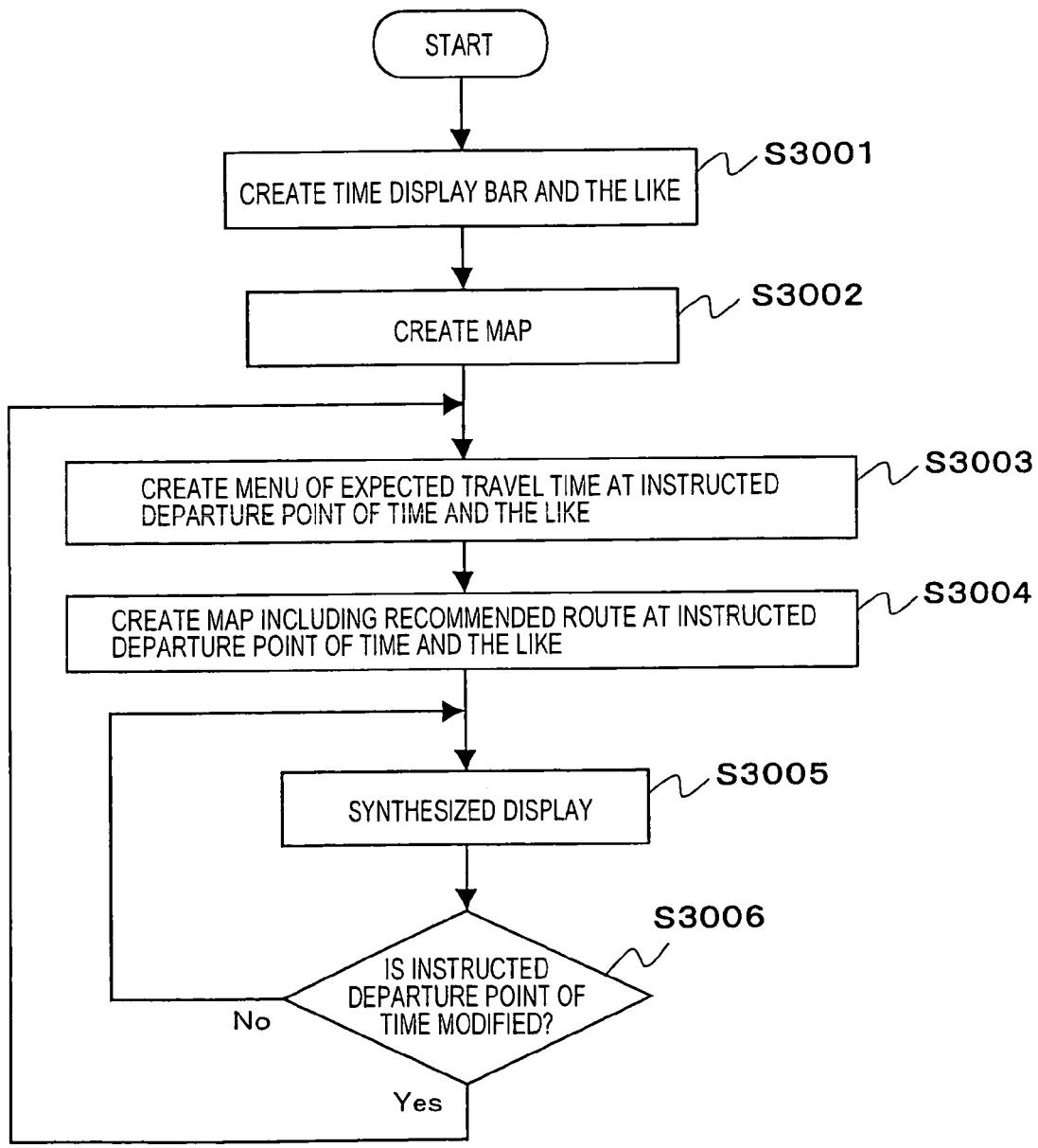
FIG. 11 is a flowchart illustrating a map display processing of a recommended route in S2006 shown in FIG. 7.

FIG. 11 is a flowchart illustrating the map display processing of the recommended route in S2006 shown in FIG. 8.

First, the route search unit 42 informs the menu display processor 50 of the departure position and the destination and instructs the menu display processor 50 to generate the time display bar 901 shown in FIG. 10. Receiving the instruction, the menu display processor 50 specifies departure points of time for the respective recommended routes having the same departure position 801 and the same destination 802 and stored in the route storage unit 43 and creates the time display bar 901 including these departure points of time (S3001).

Next, the route search unit 42 informs the map display processor 45 of the departure position and the destination and instructs the map display processor 45 to generate the map 909 shown in FIG. 10. Receiving the instruction, the map display processor 45 reads out the first conversion table from the map/statistical traffic data storage device 3 through the data reading unit 48. Then the map display processor 45 uses the first conversion table to specify a mesh ID of at least one mesh constituting an area including the same departure position 801 and the same destination 802 stored in the route storage unit 43, and reads out the map data 310 of respective meshes having the specified mesh ID from the map/statistical traffic data storage device 3 through the data reading unit 48. Then the map display processor 45 creates the map 909 including the departure position 903 and the destination 904 on the basis of the map data 310 thus read (S3002).

Next, the route search unit 42 informs the menu display processor 50 of the departure point of time instructed by the user (in an initial stage a predetermined departure point of time like an earliest departure point of time, among departure points of time for the respective recommended routes stored in the route storage unit 43) received from the user operation analyzer 41, and instructs the menu display processor 50 to create the expected travel time (expected arrival point of time) 907 and the reliability (estimated error) 908 shown in FIG. 10. Receiving the instruction, the menu display processor 50 specifies in the route storage unit 43 information of a recommended route including the departure point of time informed by the route search unit 42 and creates the display content of the expected travel time (expected arrival point of time) 907 and the reliability (estimated error) 908 on the basis of the information (S3003).

Next, the route search unit 42 informs the map display processor 45 of the departure point of time informed to the menu display processor 50 in S3003 and instructs the map display processor 45 to create the recommended route 905 shown in FIG. 10. Receiving the instruction, the map display processor 45 specifies the respective links constituting the recommended routes and the jam levels 906 of the respective jam level displaying sections on the basis of the information of the recommended route including the departure point of time informed by the route search unit 42 and stored in the route storage unit 43, and creates the display content of the recommended route 905 (S3004). Also, the map display processor 45 creates the display content of the jam levels 906.

The graphics processor 51 synthesizes the display content created by the menu display processor 50 and the map display processor 45 in S3001 to S3004, and displays on the display 2 the display frame shown in FIG. 10 (S3005).

The user operation analyzer 41 detects through the input device 5 and the voice input/output device 4 whether the user has operated the display position of the cursor 902 (S3006). In the case where the display position of the cursor 902 has been operated, the user operation analyzer 41 sets a departure point of time indicated by the new display position to a departure point of time instructed by the user and returns to S3003.

Subsequently, a route guidance operation will be described.

Figure 12:
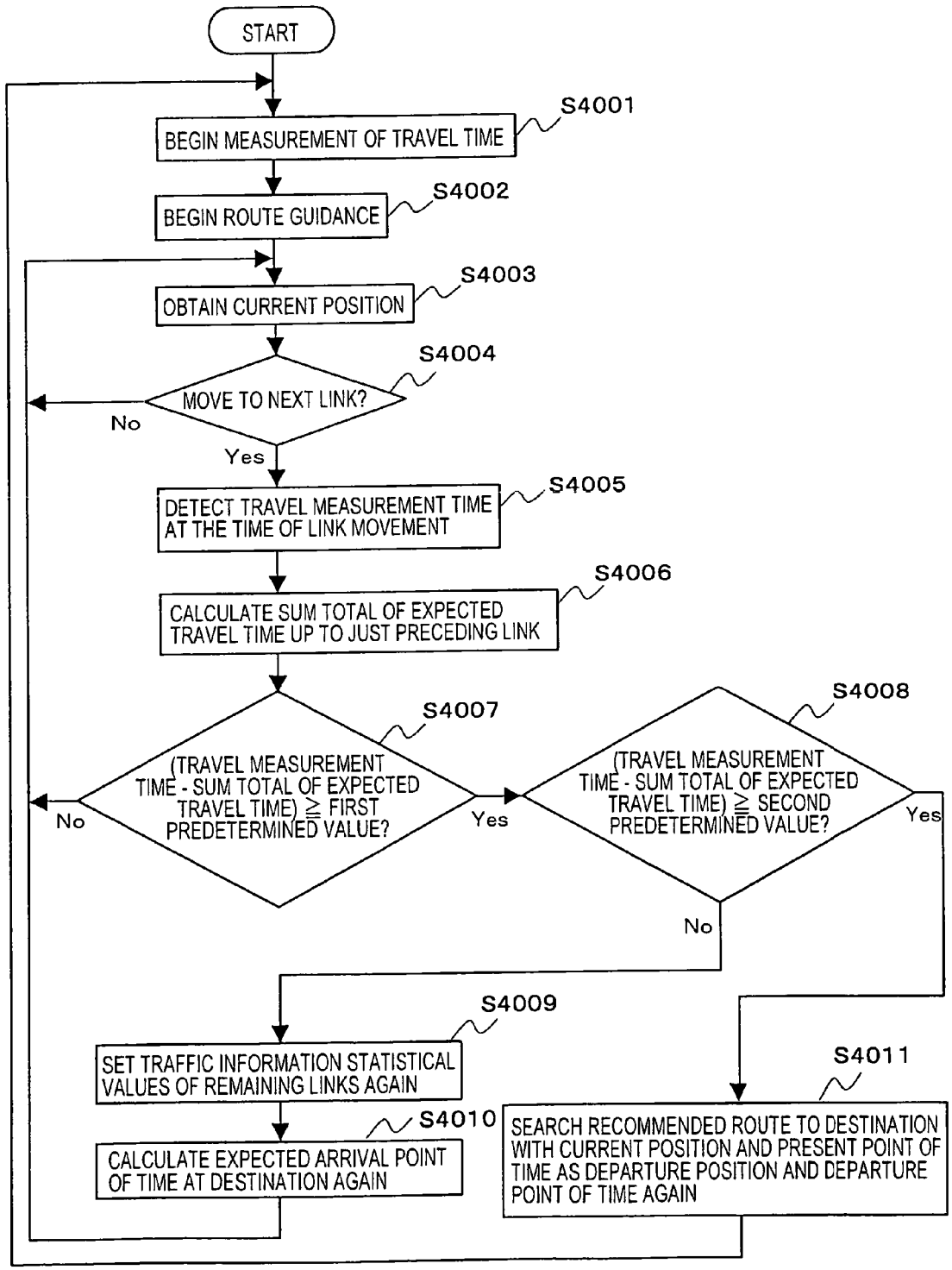
FIG. 12 is a flowchart illustrating a recommended route guidance operation of the in-vehicle type navigation device to which the first embodiment of the invention is applied.

FIG. 12 is a flowchart illustrating the recommended route guidance operation of the in-vehicle type navigation device to which the first embodiment of the invention is applied. The flow is started when the user operation analyzer 41 receives a route guidance request for a recommended route displayed on the display 2, whose departure position and departure point of time are the substantially same as the current position and the current time, from the user through the voice input/output device 4 or the input device 5.

First, the user operation analyzer 41 informs the route guidance unit 44 of the route guidance request received from the user. Receiving the request, the route guidance unit 44 uses a built-in timer (not shown) to begin measurement of travel time (S4001). Further, the route guidance unit 44 begins the route guidance with the common (existing) technique of route guidance by the use of the information of a recommended route stored in the route storage unit 43, and the map data stored in the map/statistical traffic data storage device 3 (S4002).

When the current position is newly output from the map matching processor 47 in the processing of route guidance (S4003), the route guidance unit 44 judges whether the current position has been moved to a next link from a certain link (referred to as a just preceding link), these links constituting the recommended route as the object of route guidance (S4004). In the case where the current position has not been moved (No in S4004), the route guidance unit 44 returns to S4003 to wait for new outputting of the current position from the map matching processor 47.

Meanwhile, in the case where the current position has been moved (Yes in S4004), the route guidance unit 44 detects travel time at that time and makes the travel time an actual measurement of travel time until the just preceding link (S4005). Further, the route guidance unit 44 calculates a sum total of expected travel time of respective links from the first link to the just preceding link, out of respective links constituting the recommended route as the object of route guidance, on the basis of information (traffic information statistical values) of the recommended route as the object of route guidance in the route storage unit 43 (S4006).

Thereafter, the route guidance unit 44 calculate a difference between the actual measurement of travel time until the just preceding link detected in S4005 and the sum total of expected travel time of respective links until the just preceding link obtained from the information of the recommended route in the route storage unit 43 in S4006, and compares the difference with first and second predetermined values (S4007, S4008).

Here, the second predetermined value is one which judges the necessity of searching a new recommended route extending to the destination again, and is set to, for example, (A/B)×C where A denotes the sum total of expected travel time of respective links until the just preceding link, B denotes the sum total of expected travel time of respective links constituting the recommended route, and C denotes an estimated error of expected travel time until the destination. Also, the first predetermined value is one which judges the necessity of calculating a new expected arrival point of time at the destination again, and is set to a smaller value than the second predetermined value, for example, around ⅓ of the second predetermined value.

As described above, the embodiment uses, as traffic information statistical values used for deciding a link constituting the recommended route, traffic information statistical values in a time zone including an expected arrival point of time at the initiation node of the link (see S1008 shown in FIG. 7). Accordingly, when a difference between an actual measurement of travel time until the just preceding link and the sum total of expected travel time of respective links until the just preceding link becomes large, it is required that traffic information statistical values used for deciding respective links following a link subsequent to the just preceding link constituting the recommended route are reconsidered. Hereupon, the difference is compared with the first and second predetermined values in S4007 and S4008 in the embodiment.

And when the difference is smaller than the first predetermined value (No in S4007), the route guidance unit 44 returns to S4003 to wait until the current position is newly output from the map matching processor 47.

Further, when the difference is not less than the first predetermined value and smaller than the second predetermined value (Yes in S4007 and No in S4008), the route guidance unit 44 resets traffic information statistical values of the remaining links (respective links between a link subsequent to the just preceding link and the last link (destination link)) (S4009).

Concretely, the link subsequent to the just preceding link and the last link (destination link)) out of the respective links constituting the recommended route make a first link and a (M)th link, respectively. As new traffic information statistical values of the first link, traffic information statistical values of this link which correspond to the same day type and the same weather type as those of the traffic information statistical values of this link in the route storage unit 43 and belong to a time zone including the current time are readout from the map/statistical traffic data storage device 3 through the data reading unit 48. And the traffic information statistical values of this link in the route storage unit 43 are renewed into the newly read traffic information statistical values. Further, as new traffic information statistical values of the (m)th (1<m≦M) link, traffic information statistical values of this link which corresponds to the same day type and the same weather type as those of traffic information statistical values of this link in the route storage unit 43 and belong to a time zone including a point of time obtained by adding to the current time total travel time obtained from new traffic information statistical values from the first link to a (m−1)th link are read out from the map/statistical traffic data storage device 3 through the data reading unit 48. And the traffic information statistical values of this link in the route storage unit 43 are renewed into the newly read traffic information statistical values. The processing is repeated until traffic information statistical values of respective links following a second link in the route storage unit 43 are renewed.

Then the route guidance unit 44 to calculates an expected arrival point of time at the destination again by using traffic information statistical values of the remaining links as reset, and outputs the result through the display 2 and the voice input/output device 4 to inform the user of the result (S4010). Here, the expected arrival point of time at the destination can be calculated by adding to the current time total travel time obtained from new traffic information statistical values of the respective remaining links. Thereafter, the route guidance unit 44 returns to S4003 to wait until the current position is newly output from the map matching processor 47.

Meanwhile, when the difference is not less than the second predetermined value (Yes in both S4007 and S4008), the route guidance unit 44 sets the departure position, the departure point of time, and the destination in the route search unit 42 with a current position and the current time as the departure position and the departure point of time. And the route guidance unit 44 causes the route search unit 42 to perform the recommended route search processing (see FIG. 7) (S4011). Then when a new recommended route is stored in the route storage unit 43, the route guidance unit 44 returns to S4001. The flow is terminated when the current position reaches the destination.

Subsequently, the jam point display operation will be described.

Here, the jam point display operation is one by which jam levels of respective links constituting a road specified by statistical traffic data stored in the map/statistical traffic data storage device 3 are overlapped and displayed on a map.

Figure 13:
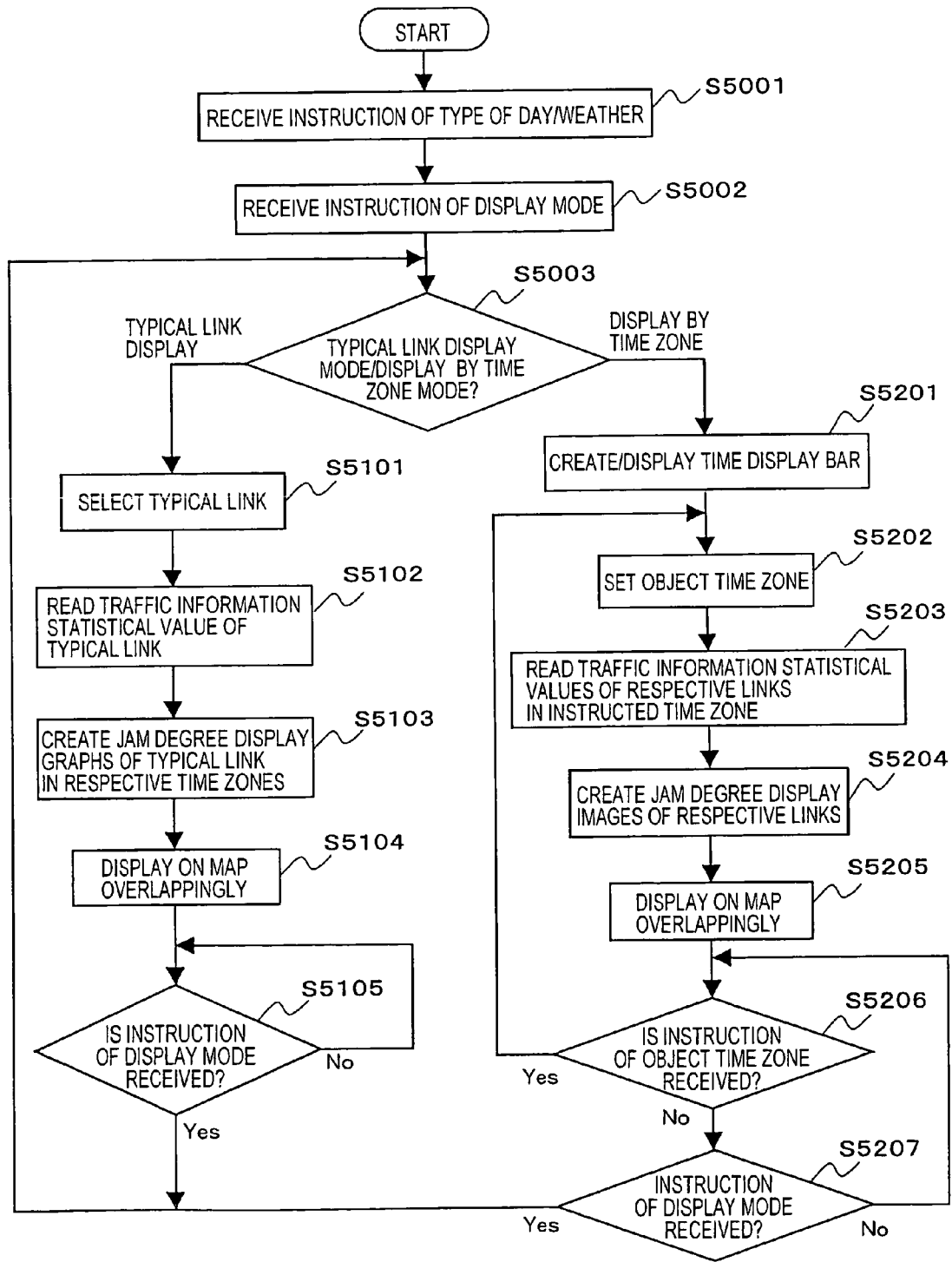
FIG. 13 is a flowchart illustrating a jam point display operation of the in-vehicle type navigation device to which the first embodiment of the invention is applied.

FIG. 13 is a flowchart illustrating the jam point display operation of the in-vehicle type navigation device to which the first embodiment of the invention is applied. The flow is started when the user operation analyzer 41 receives a jam point display request from the user through the voice input/output device 4 or the input device 5 in a state in which a map is displayed on the display 2.

First, the user operation analyzer 41 receives designation of a day type (see the reference numeral 3221 in FIG. 3) and a weather type (see the reference numeral 3222 in FIG. 3) from the user through the voice input/output device 4 or the input device 5 (S5001). Further, the user operation analyzer 41 receives designation of a display mode of jam points (S5002).

The embodiment receives designation of either of a typical link display mode in which a graph illustrating jam levels of a typical link in respective time zones is overlapped and displayed on a display position of a corresponding link on the map, and a display by time zone mode in which jam levels of respective links are displayed by time zone.

In the case where designation of the typical link display mode is received from the user, the user operation analyzer 41 sets the typical link display mode as a display mode of jam points in the map display processor 45 (S5003).

In response to the above, the map display processor 45 selects a typical link out of links constituting respective roads on the map displayed on the display 2 (S5101). The typical link is preferably one including crossings of main roads such as national roads. Road type information 3122 included in the link data 312 is used to judge whether roads constituted by links are main roads. Further, connection link information 3126 included in the link data 312 is used to judge whether crossings of main roads are included.

Next, the map display processor 45 obtains through the data reading unit 48 statistical traffic information every time zone of respective typical links corresponding to the day type and the weather type designated in S5001 from statistical traffic data having the same mesh ID as map data displayed on the display 2 in the map/statistical traffic data storage device 3 (S5102).

Subsequently, the map display processor 45 creates graphs representative of jam levels in respective time zones every typical link by using information of the degree of jam included in the statistical traffic information thus obtained (S5103). Then the map display processor 45 requests the graphics processor 51 to draw each of the created graphs in display positions of corresponding typical links. Receiving the request, the graphics processor 51 overlaps and displays the corresponding graphs on respective typical links included in the map displayed on the display 2 (S5104). The user operation analyzer 41 returns to S5003 when it newly receives designation (modification) of a display mode of jam points (Yes in S5105).

Figure 14:
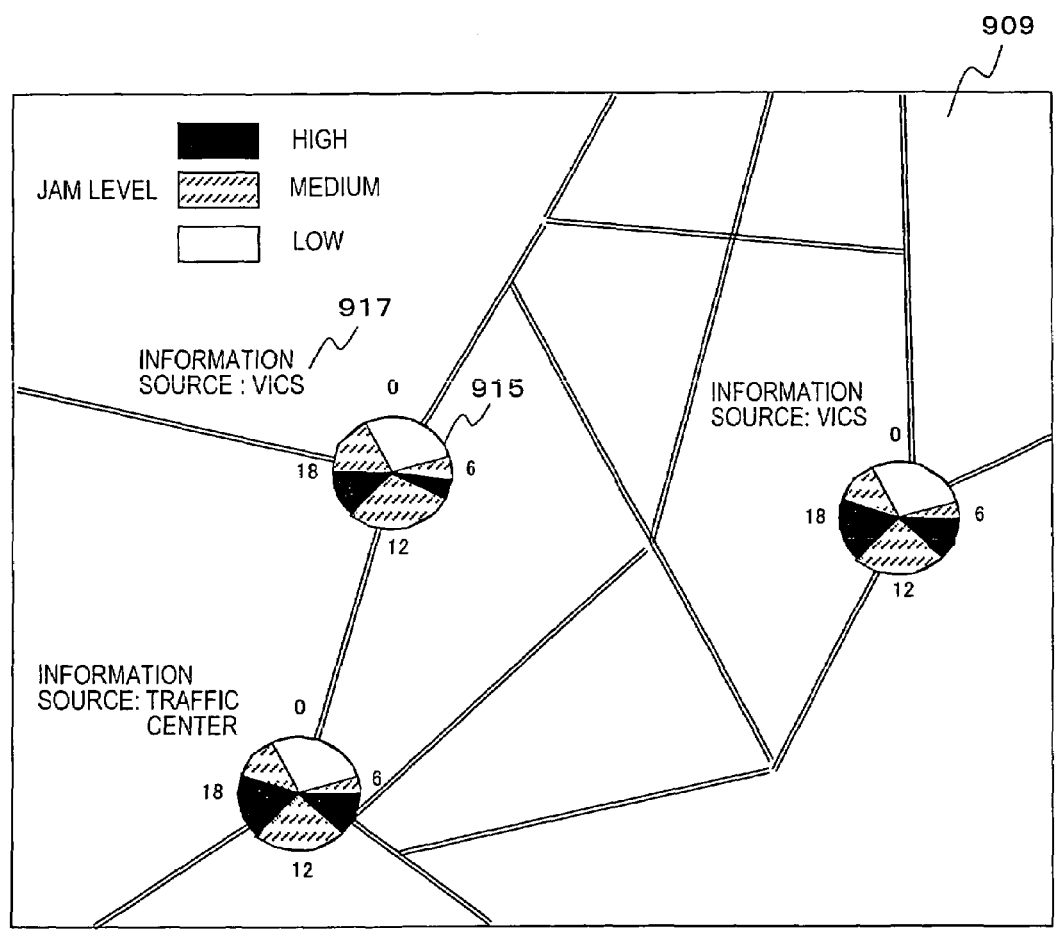
FIG. 14 is a view showing an example of jam points in a typical link display mode on the display 2.

FIG. 14 shows an example of jam points in the typical link display mode. In the example, circle graphs 915 representative of jam levels of typical links in respective time zones together with information sources 917 included in statistical traffic information used for creation of the graphs 915 are represented in the vicinity of display positions (display positions of the termination node) of corresponding typical links on the map. The user can grasp jam of respective main roads every time zone from the graphs. Also, it is possible to know information sources of jam of respective main roads every time zone.

Meanwhile, in S5003, in the case where designation of the display by time zone mode is received from the user, the user operation analyzer 41 sets the display by time zone mode as a display mode of jam points in the map display processor 45 and the menu display processor 50. In response to the above, the map display processor 45 creates a time display bar including a plurality of time zones and for designation of display time zones of jam information (S5201).

Next, the map display processor 45 sets display time zones of jam information (S5202). In the case where the user operation analyzer 41 receives designation of a time zone from the user in S5206 described later, it sets the time zone as a display time zone of jam information. In the case where the user operation analyzer receives no designation of a time zone from the user, it sets a default time zone, such as a time zone including the current time, as a display time zone of jam information.

Next, the map display processor 45 obtains through the data reading unit 48 statistical traffic information of respective links which correspond to the day type and the weather type designated in S5001 and belong to a time zone set in S5202 from statistical traffic data having the same mesh ID as map data displayed on the display 2 in the map/statistical traffic data storage device 3 (S5203).

Subsequently, the map display processor 45 creates images of links representative of jam levels in the time zone set in S5202 by using information of the degree of jam included in the statistical traffic information thus obtained (S5204). Then the map display processor 45 requests the graphics processor 51 to overlap and draw each of the created images on a corresponding link. Receiving the request, the graphics processor 51 overlaps and displays images of corresponding links on respective links included in the map displayed on the display 2 (S5205).

The user operation analyzer 41 returns to S5202 when it newly receives designation of a display time zone of jam information (Yes in S5206). Further, the user operation analyzer 41 returns to S5003 when it newly receives designation (modification) of a display mode of jam points (Yes in S5207).

Figure 15:
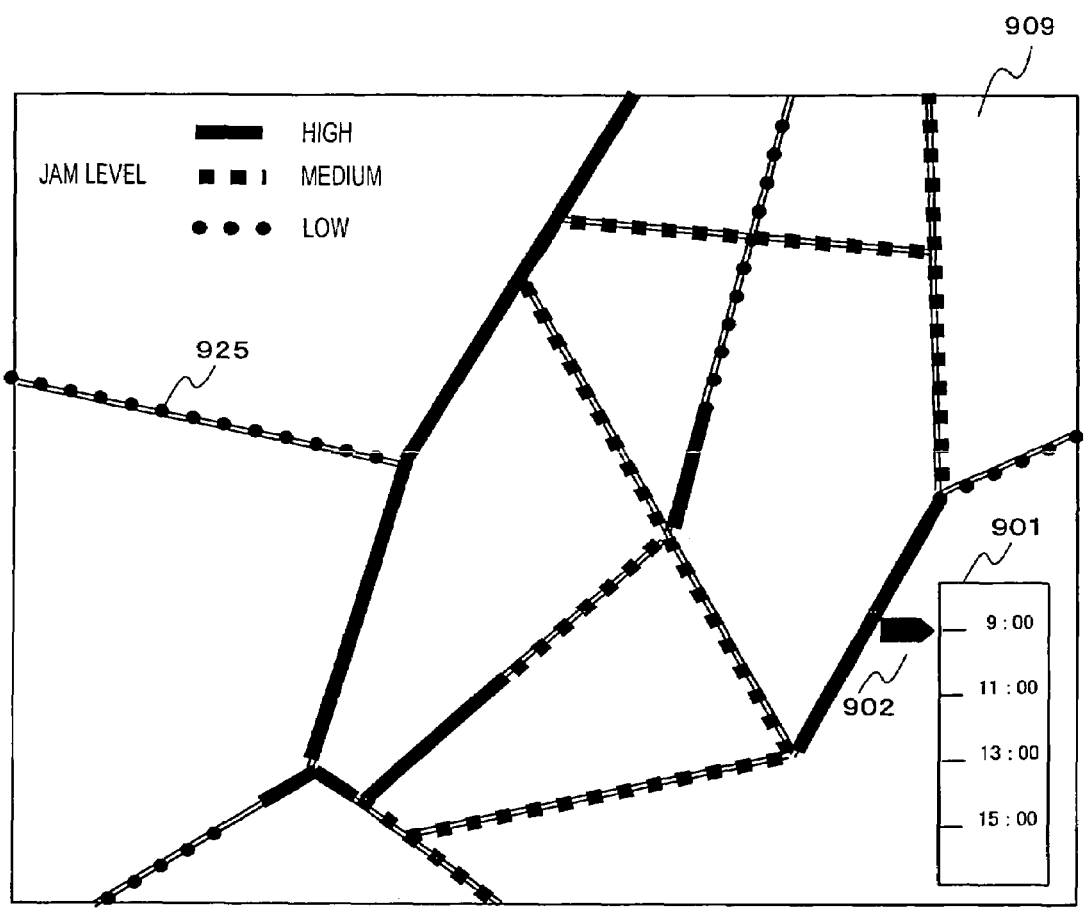
FIG. 15 is a view showing a display example of jam points in a display mode by time zone on the display 2.

FIG. 15 shows a display example of jam points in the display by time zone mode. In the example, jam levels of respective links 925 in a time zone indicated by the cursor 902 in the time display bar 901 are displayed. The user can operate the cursor 902 through the input device 5 and the voice input/output device 4. The user operation analyzer 41 informs the map display processor 45 of a time zone indicated by the cursor 902 as a time zone instructed by the user.

The first embodiment of the invention has been described above.

In the embodiment, stored in the map/statistical traffic data storage device 3 are map data including link data of respective links constituting roads on the map, and statistical data which is classified every search condition being a collection condition of traffic information and includes travel time and moving speeds in respective links which are determined by statistical values of traffic information collected in the past. And the in-vehicle type navigation device searches a recommended route from a departure position to a designation using the map data stored in the map/statistical traffic data storage device 3 and statistical data corresponding to a day type and a weather type which constitute the search condition, out of the statistical data stored in the map/statistical traffic data storage device 3. In this manner, by using the statistical data of respective links which meet with the search condition, it is possible to accurately search a recommended route of a minimum cost (travel time).

Also, the statistical data includes traffic information statistical values including travel time and moving speeds of respective links constituting roads on the map every time zone. And the in-vehicle type navigation device decides a first link out of links close to a departure position by the use of traffic information statistical values which correspond to a time zone including a departure point of time, as traffic information statistical values of the first link constituting the recommended route. Also, the in-vehicle type navigation device decides a (n)th link out of links contiguous to a (n−1)th link by the use of traffic information statistical values which correspond to a time zone including a point of time obtained by adding to the departure point of time at the departure position total travel time determined from traffic information statistical values of respective links from the first link to the (n−1)th link which constitute the recommended route, as traffic information statistical values of the (n)th link (n≧2) constituting the recommended route. In this manner, by changing time zones of traffic information statistical values used for determination of respective links constituting the recommended route according to expected travel time until the initiation node of respective links from the departure position, it is possible to accurately search a recommended route of a minimum cost (travel time).

Also, in the route guidance processing, the in-vehicle type navigation device compares actual travel time from the departure position to the current position in the recommended route with that travel time for a section from the departure position to the current position in the recommended route which is obtained from traffic information statistical values used for determination of respective links, and judges the necessity of searching a new recommended route again according to the result of comparison. Then, in the case where the necessity of searching a recommended route again is judged, the in-vehicle type navigation device searches a new recommended route to the destination with a current position and the current time as the departure position and the departure point of time. Thus even when the vehicle is running on the current recommended route, a recommended route can be again searched in route guidance so that the vehicle runs on a route of minimum cost (travel time).

Also, the statistical data includes traffic information statistical values including the degree of jam every time zone in respective links constituting roads on the map. Further, the in-vehicle type navigation device overlaps and displays that degree of jam every time zone in respective links which is specified from the statistical data corresponding to a collection condition instructed by the user, out of the statistical data of respective links included in the map data of the map displayed on the display 2, on the map. By performing the processing, it becomes possible to classify and display the tendency of jam on roads in detail according to the situation. Also, it becomes easy to grasp a change in road jam due to a change in time zone.

Second Embodiment

A second embodiment according to the present invention will be described hereinafter with reference to the accompanying drawings.

Figure 16:
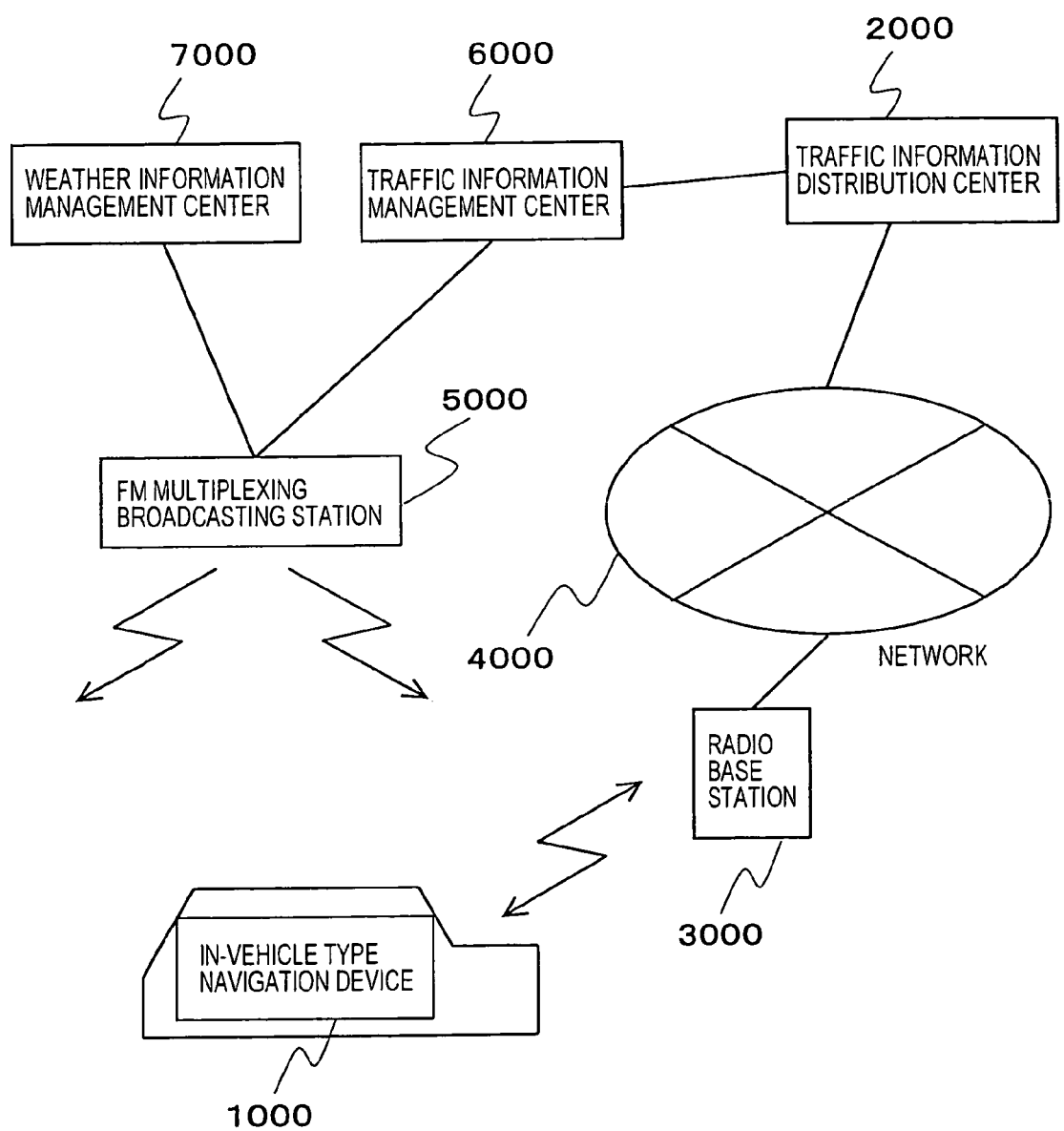
FIG. 16 is a schematic view showing a navigation system to which a second embodiment according to the invention is applied.

FIG. 16 is a schematic view showing a navigation system to which the second embodiment according to the present invention is applied. As shown in FIG. 16, the navigation system according to the embodiment comprises an in-vehicle type navigation device 1000 mounted on a vehicle, a traffic information distribution center 2000 connected to the in-vehicle type navigation device 1000 through a radio base station 3000 and a network 4000, a FM multiplexing broadcasting station 5000, a traffic information management center 6000, and a weather information management center 7000.

The traffic information management center 6000 manages latest traffic information in respective regions and distributes the traffic information to the traffic information distribution center 2000 and the FM multiplexing broadcasting station 5000.

The weather information management center 7000 manages weather information in respective regions and distributes the weather information to the FM multiplexing broadcasting station 5000.

The FM multiplexing broadcasting station 5000 broadcasts, as FM multiplexing broadcasting signals, outline present status traffic data of respective mesh areas which is created on the basis of traffic information in respective regions distributed by the traffic information management center 6000, the mesh areas been obtained by dividing a map into a plurality of portions. The outline present status traffic data includes the degree of link jam determined by current (latest) traffic information every link constituting roads located in a corresponding mesh area. Also, the FM multiplexing broadcasting station 5000 broadcasts traffic restriction information which is information of a link under traffic restriction, as FM multiplexing broadcasting signals. Further, the FM multiplexing broadcasting station 5000 broadcasts weather information of respective regions distributed from the weather information management center 7000 as FM multiplexing broadcasting signals. The weather information from the weather information management center 7000 can be distributed not from the FM multiplexing broadcasting station 5000 but from the traffic information distribution center 2000 described later.

The traffic information distribution center 2000 manages present status traffic data every mesh region obtained by dividing a map into a plurality of portions. The present status traffic data include link travel time (or a link moving speed) and a degree of link jam which are determined by current (latest) traffic information, every link constituting roads located in a corresponding mesh area. Concretely, the traffic information distribution center 2000 manages present status traffic data in a corresponding mesh area correspond with its mesh ID. The mesh ID is the same as the mesh ID 311 of the map data 310 and the mesh ID 321 of the statistical traffic data 320 described in the first embodiment. Also, in the present status traffic data, link travel time (or a link moving speed) and a degree of link jam are registered in correspond with a link ID. The link ID is the same as the link ID used in the map data 310 and the statistical traffic data 320 described in the first embodiment. Also, the degree of link jam is set according to the same standards as those for the degree of link jam used in the statistical traffic data 320.

The in-vehicle type navigation device 1000 holds statistical traffic data every mesh area. The statistical traffic data include link travel time (or a link moving speed) and a degree of link jam which are determined by statistical values of traffic information collected in the past, every link constituting roads existent in a corresponding mesh area.

With the above configuration, the in-vehicle type navigation device 1000 accesses to the traffic information distribution center 2000 through the radio base station 3000 and the network 4000 in accordance without line present status traffic data in a mesh area corresponding to the periphery of a current position (vehicle position) which are received from the FM multiplexing broadcasting station 5000, and obtains present status traffic data in a mesh area corresponding to the periphery of the current position, if necessary. Further, using the present status traffic data obtained from the traffic information distribution center 2000 and the statistical traffic data beforehand held by the in-vehicle type navigation device 1000, the in-vehicle type navigation device 1000 searches a recommended route from the current position to the destination. At this time, the in-vehicle type navigation device 1000 refers that weather information in the periphery of the current position which is received from the FM multiplexing broadcasting station 5000, in order to decide statistical traffic data being used.

Subsequently, the in-vehicle type navigation device 1000 will be described in detail.

The traffic information distribution center 2000 should just be equipped with a function for managing the present status traffic data every mesh area and a function for reading out the present status traffic data every mesh area requested by the in-vehicle type navigation device 1000 to transmit the data to the in-vehicle type navigation device 1000. Since the traffic information distribution center 2000 can be constructed on a computer system with the use of an existent technique, its detailed explanation is omitted in the embodiment. Also, since an existent system is made use of to be able to construct the traffic information management center 6000, the weather information management center 7000, and the FM multiplexing broadcasting station 5000, their detailed explanation is omitted.

Figure 17:
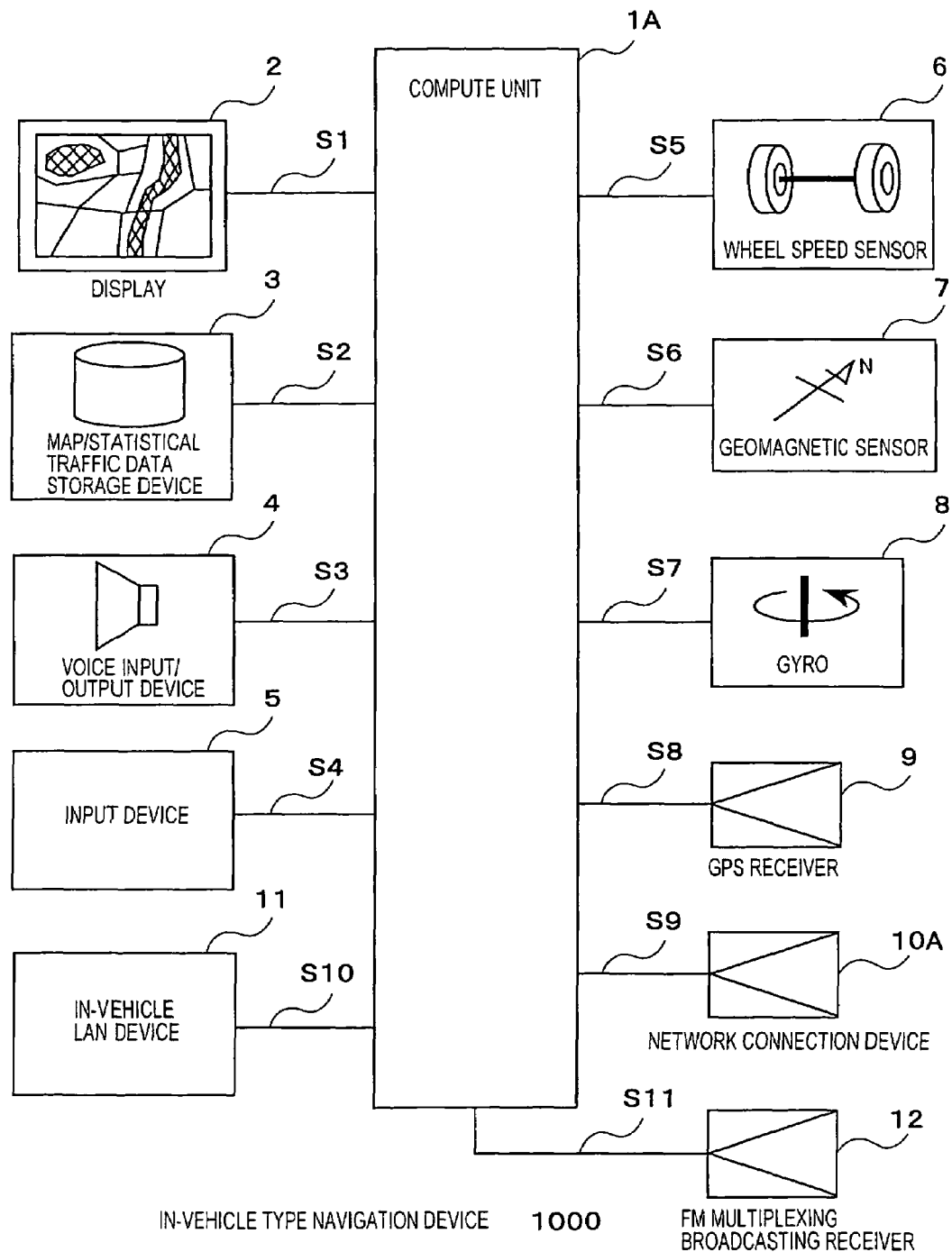
FIG. 17 is a schematic view showing a configuration of an in-vehicle type navigation device 1000.

FIG. 17 is a schematic view showing a configuration of the in-vehicle type navigation device 1000. As shown in FIG. 17, the in-vehicle type navigation device 1000 according to the embodiment is different from the navigation device 1000 of the first embodiment shown in FIG. 1 in that a compute unit 1A is provided in place of the compute unit 1 and a network connection device 10A and a FM multiplexing broadcasting receiver 12 are provided in place of the weather information receiver 10. The remaining configuration of the in-vehicle type navigation device according to the embodiment is the same as the navigation device of the first embodiment.

The network connection device 10A controls a radio communication device, such as portable telephone or the like, connected to the in-vehicle type navigation device 1000 and accesses to the traffic information distribution center 2000 through the radio base station 3000 and a network such as public network, Internet and the like. Further, the network connection device 10A communicates with the traffic information distribution center 2000.

The FM multiplexing broadcasting receiver 12 receives outline present status traffic data, traffic restriction information, and weather information sent as FM multiplexing broadcasting signals from the FM multiplexing broadcasting station 5000.

Here, the outline present status traffic data includes mesh IDs (the same as mesh IDs used in the map data 310, the statistical traffic data 320 and the present status traffic data) every mesh area included in an object region (for example, unit of the metropolis and districts), and link IDs and the degree of link jam (set according to the same standards as those for the degree of link jam used in the statistical traffic data 320 and the present status traffic data) of respective links included in the mesh regions.

Also, traffic restriction information includes link IDs of links being restricted, and mesh IDs of meshes including the links being restricted.

Also, the weather information includes mesh IDs (the same as mesh IDs used in the map data 310, the statistical traffic data 320 and the present status traffic data) of mesh areas included in an object region (for example, unit of the metropolis and districts), a weather type (weather type registered in the table 3222 of the statistical traffic data 320) of weather in the object region, and time zones (referred to as object time zones) in which the weather continues.

As for the weather information, the state of the operation of a wiper on a vehicle on which the in-vehicle type navigation device 1000 is mounted, and a detection value of an outside air temperature sensor mounted on the vehicle may be received through the in-vehicle LAN device 11, and weather may be judged on the basis of the result as received.

The compute unit 1A can search a recommended route by the use of the present status traffic data obtained from the traffic information distribution center 2000 in addition to the map data and the statistical traffic data stored in the map/statistical traffic data storage device 3. The compute unit 1A is different from the compute unit 1 in the first embodiment in this point.

Figure 18:
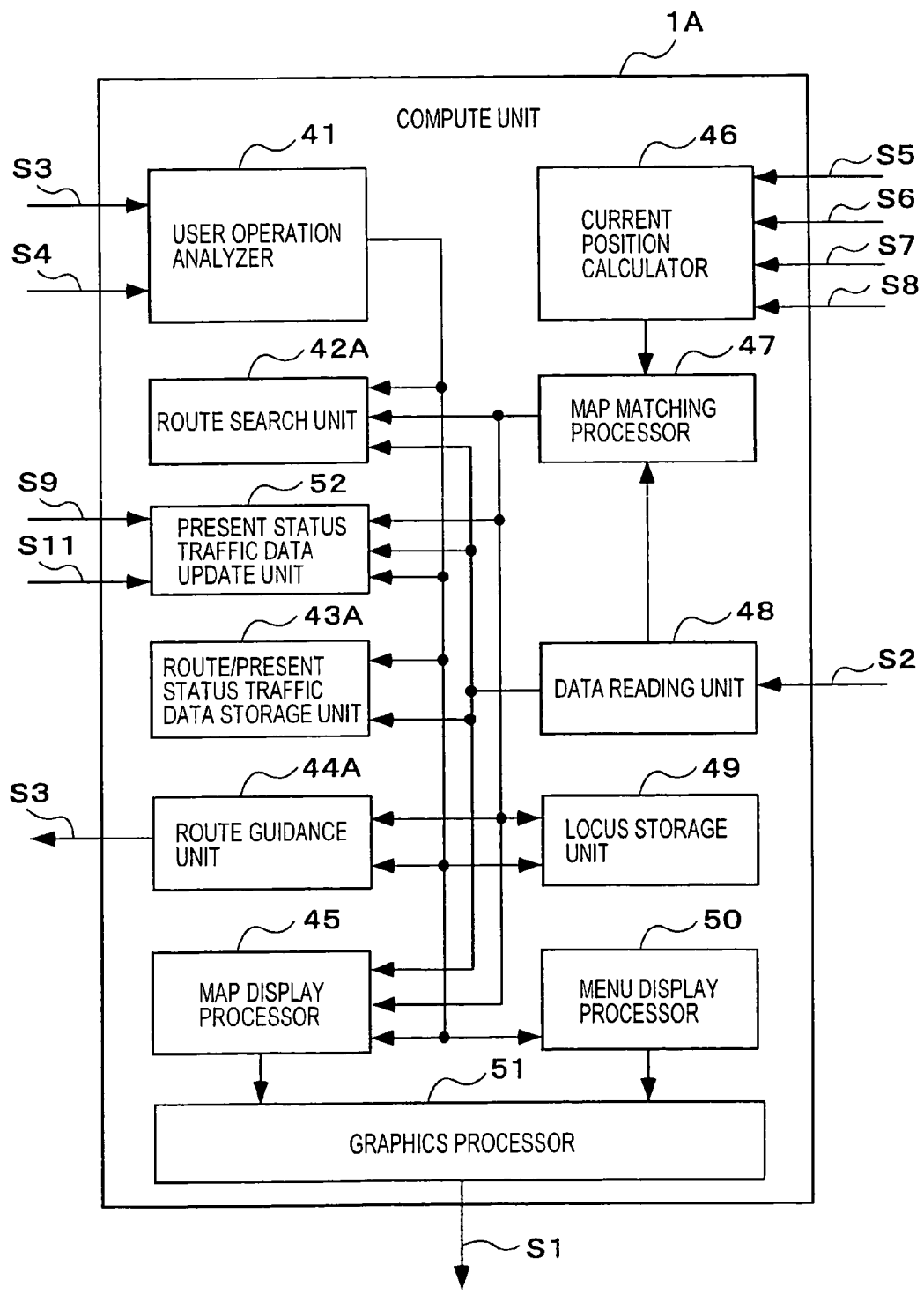
FIG. 18 is a diagram showing the functional configuration of a compute unit 1A.

FIG. 18 is a diagram showing the functional configuration of the compute unit 1A. The hardware configuration of the compute unit 1A is the same as that of the compute unit 1 in the first embodiment.

As shown in FIG. 18, the compute unit 1A according to the present embodiment is different from the compute unit 1 according the first embodiment in that a route search unit 42A is provided in place of the route search unit 42, a route/present status traffic data storage unit 43A is provided in place of the route storage unit 43, a route guidance unit 44A is provided in place of the route guidance unit 44, and a present status traffic data update unit 52 is added. The remaining configuration of the compute unit 1A according to the embodiment is the same as the compute unit 1 of the first embodiment.

The present status traffic data update unit 52 obtains present status traffic data from the traffic information distribution center 2000 through the network connection device 10A and updates the present status traffic data stored in the route/present status traffic data storage unit 43A.

The route search unit 42A searches a route through which the vehicle can reach a destination in the shortest time (a route of the minimum cost (travel time)), out of routes connecting two specified points (the current position, the destination) from map data by using the Dijikstra method or the like, and stores the searched route as a recommended route in the route/present status traffic data storage unit 43A. In addition, while the statistical traffic data stored in the map/statistical traffic data storage device 3 is used in the first embodiment for the purpose of cost-calculation of cost of a route connecting two points, the present embodiment also uses the present status traffic data stored in the route/present status traffic data storage unit 43A in addition to the statistical traffic data.

Subsequently, the operation of the in-vehicle type navigation device 1000 will be described.

First, the present status traffic data update operation will be described.

Figure 19:
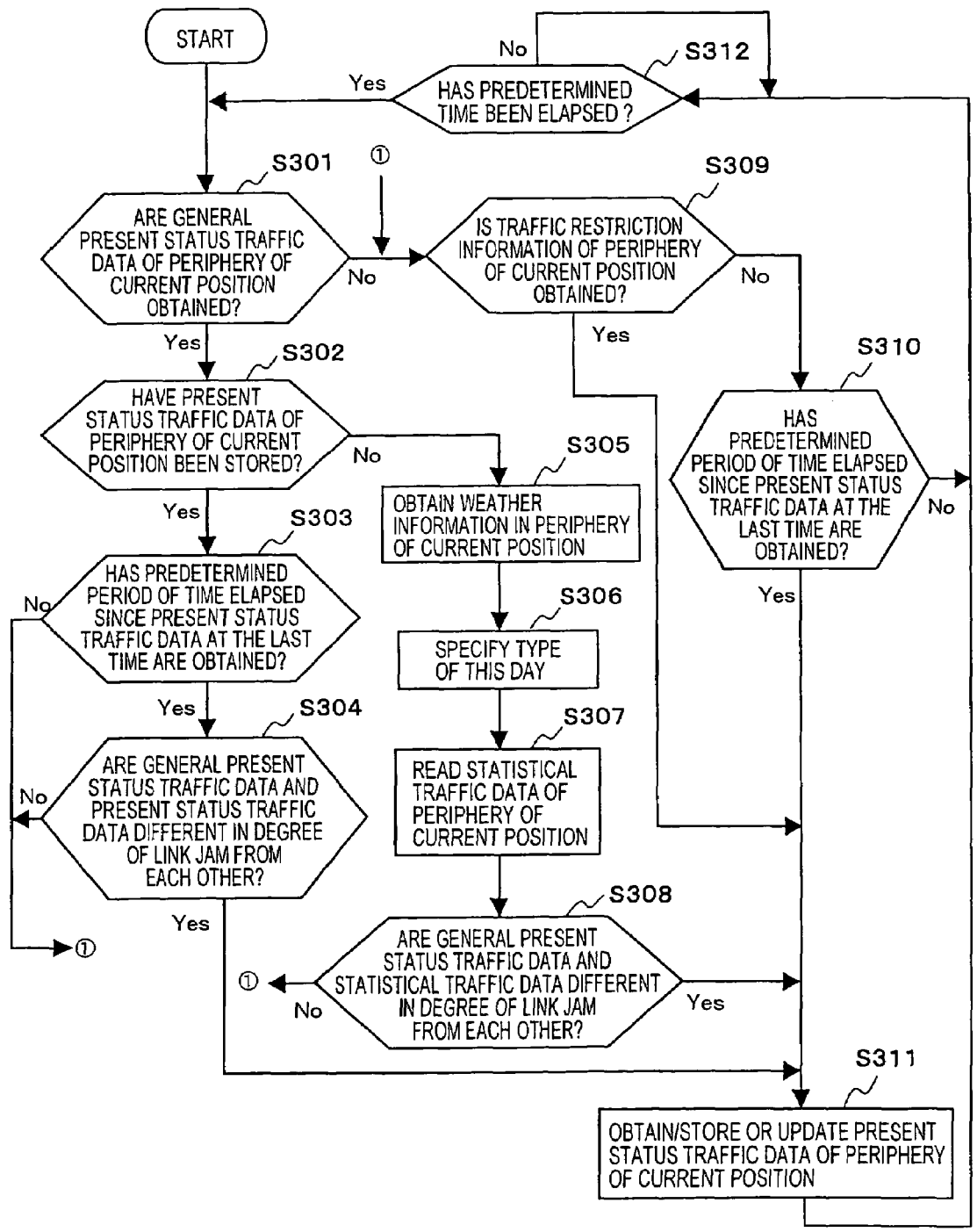
FIG. 19 is a flowchart illustrating a present status traffic data update operation of the in-vehicle type navigation device 1000 to which the second embodiment according to the invention is applied.

FIG. 19 is a flowchart illustrating the present status traffic data update operation of the in-vehicle type navigation device 1000 to which the embodiment is applied.

First, the present status traffic data update unit 52 reads out the first conversion table from the map/statistical traffic data storage device 3 through the data reading unit 48. Then, by using the first conversion table, the present status traffic data update unit 52 specifies a mesh ID of a mesh area including the periphery of the current position output from the map matching processor 47. Next, the present status traffic data update unit 52 judges whether outline present status traffic data having a mesh ID of a mesh area including the periphery of the current position is included in outline present status traffic data received from the FM multiplexing broadcasting station 5000 through the FM multiplexing broadcasting receiver 12 (S301).

In the case where outline present status traffic data having the mesh ID of the mesh area including the periphery of the current position is included in outline present status traffic data received from the FM multiplexing broadcasting station 5000 (Yes in S301), the present status traffic data update unit 52 investigates whether the present status traffic data having the mesh ID of the mesh area including the periphery of the current position have already been stored in the route/present status traffic data storage unit 43A (S302).

In S302, in the case where the present status traffic data having the mesh ID of the mesh area including the periphery of the current position have already been stored, the present status traffic data update unit 52 uses a built-in timer or the like (not shown) to further investigate whether a first predetermined period of time (a time interval, for example, 100 minutes, shorter than which a change in traffic situation cannot be expected) has elapsed (S303). In the case where the first predetermined period of time has elapsed (Yes in S303), the present status traffic data update unit 52 obtains a difference between the degree of link jam indicated by the outline present status traffic data and the degree of link jam indicated by present status traffic data for respective links included in the mesh area including the periphery of the current position. Then the present status traffic data update unit 52 investigates whether the number of links in which the difference is larger than a predetermined value (or a ratio of the number of links to the number of all links included in the mesh area including the periphery of the current position) is larger than a predetermined threshold value (S304).

In the case where the number of links in which the difference is larger than the predetermined value is larger than the predetermined threshold value (Yes in S304), the present status traffic data update unit 52 accesses to the traffic information distribution center 2000 through the network connection device 10A to obtain present status traffic data having the mesh ID of the mesh area including the periphery of the current position from the traffic information distribution center 2000. And the present status traffic data update unit 52 stores the present status traffic data thus obtained in the route/present status traffic data storage unit 43A (S311). Then the present status traffic data update unit 52 proceeds to S312.

Meanwhile, in the case where the first predetermined period of time has not elapsed since present status traffic data at the last time was obtained (No in S303), or in the case where the number of links in which the difference is larger than the predetermined value is smaller than the predetermined threshold value (No in S304), the present status traffic data update unit 52 proceeds to S309.

In the case where the present status traffic data having the mesh ID of the mesh area including the periphery of the current position have not yet been stored in the route/present status traffic data storage unit 43A in S302, the present status traffic data update unit 52 obtains the mesh ID of the mesh area including the periphery of the current position and weather information of a time zone including the current time from the FM multiplexing broadcasting station 5000 through the FM multiplexing broadcasting receiver 12 (S305). The present status traffic data update unit 52 may judge weather from the state of the operation of a wiper and an outside air temperature received through the in-vehicle LAN device 11, and make use of the result of judgment as weather information.

Subsequently, the present status traffic data update unit 52 reads out the second conversion table from the map/statistical traffic data storage device 3 through the data reading unit 48. Then the present status traffic data update unit 52 specifies a day type (departure day) by using the second conversion table (S306). In the case where the date of this day is not registered in the second conversion table, a day type corresponding to this day may be specified by using the software installed in the in-vehicle type navigation device to perform the processing of specifying a day type on the basis of the date through the calculation logic. In this manner, in the case where a range of the date registered in the second conversion table is exceeded, the processing can be continued and executed.

Subsequently, the present status traffic data update unit 52 reads out from the map/statistical traffic data storage device 3 through the data reading unit 48 statistical traffic data 320 having the mesh ID of the mesh area including the periphery of the current position. Then the present status traffic data update unit 52 specifies traffic information statistical values of a time zone including the current time on the basis of the read statistical traffic data 320 for respective links corresponding to the day type specified in S305 and the weather type specified from the weather information obtained in S306 (S307).

Then the present status traffic data update unit 52 finds a difference between the degree of link jam indicated by the outline present status traffic data and the degree of link jam indicated by the specified traffic information statistical values for respective links included in the mesh area including the periphery of the current position. And the present status traffic data update unit 52 investigates whether the number of links in which the difference is larger than the predetermined value (or a ratio of the number of links to the number of all links included in the mesh area including the periphery of the current position) is larger than the predetermined threshold value (S308).

And in the case where the number of links in which the difference is larger than the predetermined value is larger than the predetermined threshold value in S308, the present status traffic data update unit 52 proceeds to S311 to store in the route/present status traffic data storage unit 43A present status traffic data having the mesh ID of the mesh area including the periphery of the current position and obtained from the traffic information distribution center 2000 (S311). Then the present status traffic data update unit 52 proceeds to S312. Meanwhile, in the case where the number of links is smaller than the predetermined threshold value, the present status traffic data update unit 52 proceeds to S309.

Subsequently, in S309, the present status traffic data update unit 52 investigates whether traffic restriction information having the mesh ID of the mesh area including the periphery of the current position is included in traffic restriction information received from the FM multiplexing broadcasting station 5000 through the FM multiplexing broadcasting receiver 12. In the case where such traffic restriction information is included, the present status traffic data update unit 52 proceeds to S311 to store in the route/present status traffic data storage unit 43A present status traffic data having the mesh ID of the mesh area including the periphery of the current position and obtained from the traffic information distribution center 2000 (S311). Then the present status traffic data update unit 52 proceeds to S312. Meanwhile, in the case where such traffic restriction information is not included, the present status traffic data update unit 52 proceeds to S310.

Subsequently, in S310, the present status traffic data update unit 52 uses a built-in timer or the like (not shown) to investigate whether a second predetermined period of time (a time interval, for example, 30 minutes, during which a change in traffic situation can be expected and which is longer than the first predetermined period of time) has elapsed. In the case where the second predetermined period of time has elapsed (Yes in S310), the present status traffic data update unit 52 proceeds to S311 to store in the route/present status traffic data storage unit 43A present status traffic data having the mesh ID of the mesh area including the periphery of the current position and obtained from the traffic information distribution center 2000 (S311) Then the present status traffic data update unit 52 proceeds to S312. Meanwhile, in the case where the second predetermined period of time has not elapsed (No in S310), the present status traffic data update unit 52 proceeds immediately to S312.

In S312, the present status traffic data update unit 52 uses a built-in timer or the like (not shown) to wait until a third predetermined period of time (a time interval, for example, 5 minutes, during which update of outline present status traffic data can be expected and which is longer than the first predetermined period of time) has elapsed, and returns to S301.

In this flow, new present status traffic data are obtained to be stored in the route/present status traffic data storage unit 43A in one of the cases: (1) the degree of link jam indicated by the statistical traffic data and the degree of link jam indicated by the late stout line present status traffic data are different from each other, (2) the degree of link jam indicated by the present status traffic data having been stored in the route/present status traffic data storage unit 43A and the degree of link jam indicated by the latest outline present status traffic data are different from each other, (3) traffic restriction information in the periphery of the current position is obtained, and (4) the second predetermined period of time has elapsed since present status traffic data was obtained at the last time. In the case where the first predetermined period of time has not elapsed since present status traffic data was obtained at the last time, however, present status traffic data is not obtained. In this manner, while frequency of access to the traffic information distribution center 2000 is suppressed, it is possible to prevent present status traffic data from becoming too old.

Subsequently, the recommended route search operation will be described.

Figure 20:
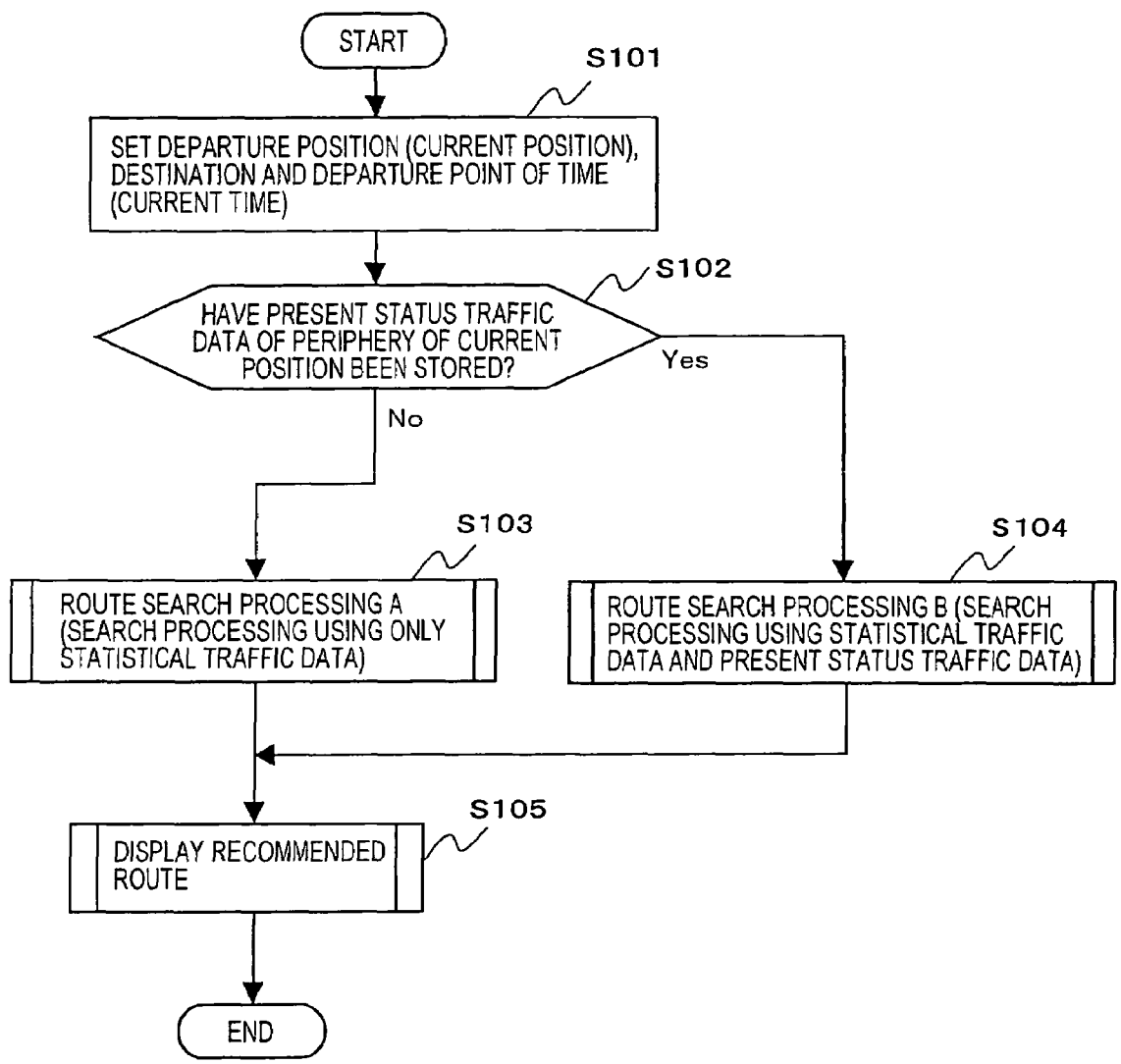
FIG. 20 is a flowchart illustrating a recommended route search operation of the in-vehicle type navigation device 1000 to which the second embodiment according to the invention is applied.

FIG. 20 is a flowchart illustrating the recommended route search operation of the in-vehicle type navigation device 1000 to which the embodiment is applied. The flow is started when the user operation analyzer 41 receives a recommended route search request from a user through the voice input/output device 4 or the input device 5.

First, the user operation analyzer 41 sets a departure position, a destination and a departure point of time in the route search unit 42 in the same manner as that in S1001 to S1003 illustrated in the first embodiment and shown in FIG. 7 (S101). In the present embodiment, however, the current time is set to a departure point of time.

When the departure position, the destination and the departure point of time has been set in the route search unit 42, the user operation analyzer 41 outputs a route search instruction to the route search unit 42A. Receiving the instruction, the route search unit 42A reads out the first conversion table from the map/statistical traffic data storage device 3 through the data reading unit 48. Then, using the first conversion table, the route search unit 42A specifies the mesh ID of the mesh area including the periphery of the current position and output from the map matching processor 47. Next, the route search unit 42A investigates whether present status traffic data having the mesh ID of the mesh area including the periphery of the current position have been stored in the route/present status traffic data storage unit 43A (S102).

In the case where such present status traffic data is not stored in S102, the route search unit 42A proceeds to S103 to make use of the statistical traffic data stored in the map/statistical traffic data storage device 3 to search a recommended route (route search processing A). Meanwhile, in the case where such present status traffic data is stored, the route search unit 42A proceeds to S104 to make use of the present status traffic data stored in the route/present status traffic data storage unit 43, and the statistical traffic data stored in the map/statistical traffic data storage device 3 to search a recommended route (route search processing B).

When a recommended route between the current position (departure position) and the destination is detected in the above manner, the route search unit 42A proceeds to S105 to perform the recommended route search display processing.

Subsequently, the route search processing A will be described. The route search processing A in the present embodiment is the same as the recommended route search operation in the first embodiment, that is, S1004 to S1013 illustrated in the first embodiment and shown in FIG. 7.

Figure 21:
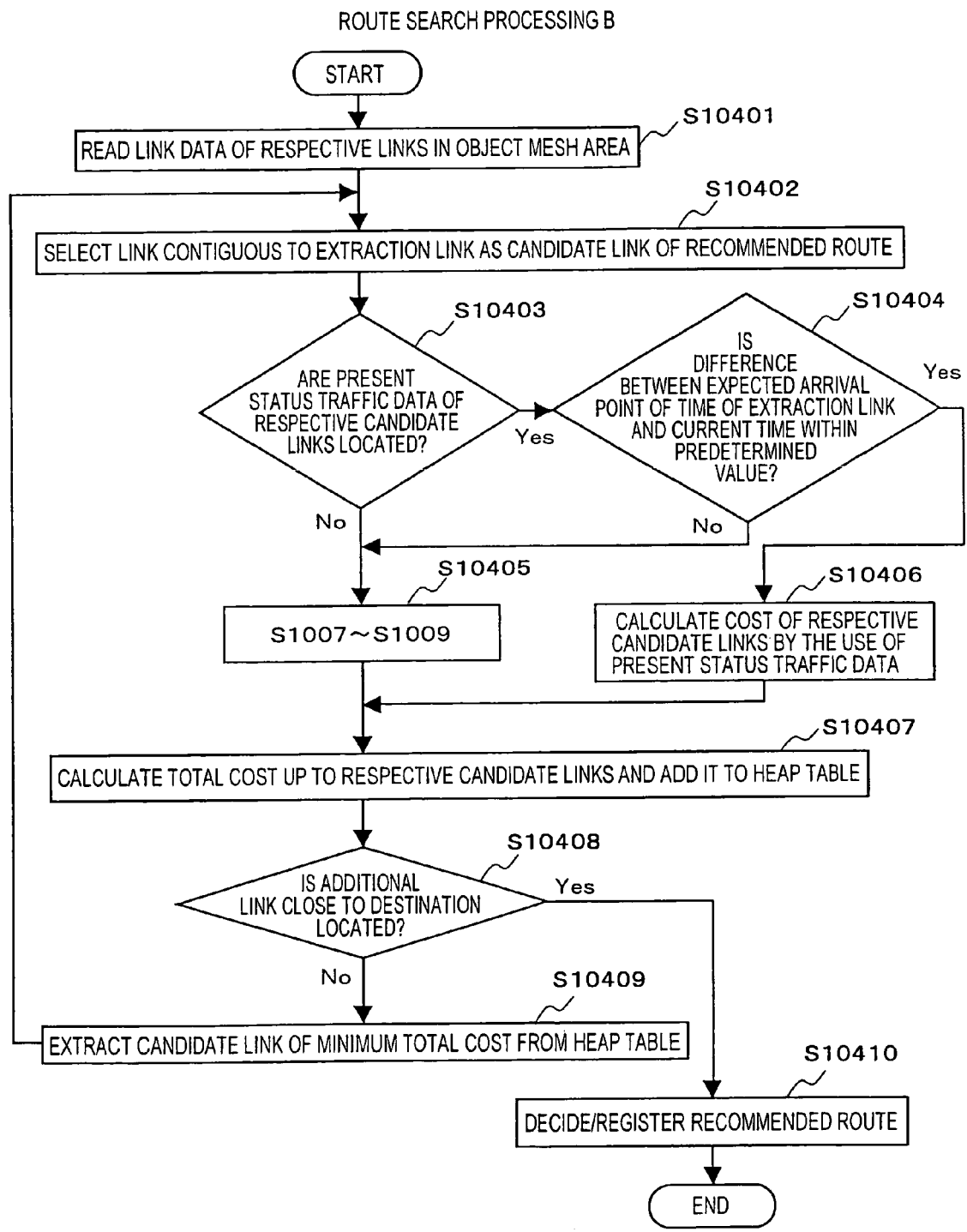
FIG. 21 is a flowchart illustrating a processing (route search processing B) in S104 shown in FIG. 20.

Subsequently, the route search processing B will be described. FIG. 21 is a flowchart illustrating the processing (the route search processing B) in S104 shown in FIG. 20.

First, the route search unit 42A obtains respective link data 312 in respective mesh areas included in a region including the departure position and the destination in the same processing as that in S1004, S1005 illustrated in the first embodiment and shown in FIG. 7. Also, the route search unit 42A specifies a day type (departure day) (S10401).

Next, the route search unit 42A uses the respective link data 312 obtained in S10401 to select a link, in which a termination node of an extraction link extracted from a heap table in S10409 described later is made its initiation node, as a candidate link constituting a recommended route. In the case where the processing in S10409 is not performed, that is, in the initial stage in which no link is registered in the heap table, however, the route search unit 42A selects at least one link in which the departure position is existent, or which is close to the departure position as the candidate link instead of selecting a link, in which the termination node of the extraction link is made its initiation node, as the candidate link (S10402).

Next, the route search unit 42A investigates whether link travel time (or a link moving speed) and the degree of link jam in respective candidate links selected in S10402 are included in the present status traffic data stored in the route/present status traffic data storage unit 43A (S10403). In the case where the link travel time and the degree of link jam are included (Yes in S10403), the route search unit 42A calculates an expected arrival point of time at the termination node of the extraction link. Then the route search unit 42A further investigates whether a difference between the expected arrival point of time and the current time is within a predetermined value (S10404). Here, the predetermined value is preferably set to a period of time thought to be too small for a large change to come out in traffic situation, that is, a period of time (for example, 30 minutes) thought to be one during which there is no large change from the traffic situation indicated by present status traffic data even after the predetermined value has elapsed since the current time.

And in the case where link travel time (or a link moving speed) and the degree of link jam in respective candidate links selected in S10402 are not included in the present status traffic data stored in the route/present status traffic data storage unit 43A (No in S10403), or in the case where a difference between the expected arrival point of time at the termination node of the extraction link and the current time is not less than the predetermined value and it is judged that there is a high possibility that the traffic situation at the expected arrival point of time has changed much from the traffic situation indicated by the present status traffic data (No in S10404), the route search unit 42A proceeds to S10405 to perform the same processing as that in S1007 to S1009 illustrated in the first embodiment and shown in FIG. 7. Thereby, the route search unit 42A uses traffic information statistical values of the statistical traffic data to calculate cost for respective candidate links.

Meanwhile, in the case where link travel time (or a link moving speed) and the degree of link jam in respective candidate links selected in S10402 are included in the present status traffic data stored in the route/present status traffic data storage unit 43A (Yes in S10403), and in the case where a difference between the expected arrival point of time at the termination node of the extraction link and the current time is below the predetermined value and it is judged that there is a high possibility that the traffic situation at the expected arrival point of time has not changed much from the traffic situation indicated by the present status traffic data (Yes in S10404), the route search unit 42A obtains link travel time of respective candidate links from the present status traffic data stored in the route/present status traffic data storage unit 43A. Alternatively, the route search unit 42A obtains link moving speeds for respective candidate links. Then the route search unit 42A uses link moving speeds for respective candidate links and link lengths included in the link data 312 of respective candidate links to calculate link travel time of respective candidate links to make the calculated link travel time of respective candidate links cost for respective candidate links (S10406).

Next, the route search unit 42A calculates a total cost (total travel time needed until the termination node of a candidate link from a departure position) of respective candidate links. Concretely, the route search unit 42A adds cost of candidate links calculated in S10405 or S10406 to total cost of extraction links registered in the heap table, and makes the result of addition total cost of the candidate links. In the initial stage in which no extraction link is registered in the heap table, however, the cost of the candidate link calculated in S10405 or S10406 is made the total cost of the candidate link. Then the route search unit 42A adds link data and total cost of respective candidate links to the heap table (S10407).

Next, the route search unit 42A investigates whether the destination link is present in links which are added to the heap table in S10407 performed just before (S10408).

In the case where the destination link is not present (No in S10408), the route search unit 42A sorts information of links registered in the heap table in the order of decreasing total cost and extracts a non-extraction link of the minimum total cost from the heap table by extracting a non-extraction link positioned at the top (S10409). Then the route search unit 42A returns to S10402.

Meanwhile, in the case where it is judged that a destination link is present (Yes in S10408), the route search unit 42A decides a recommended route in the same processing illustrated in the first embodiment and in S1013 shown in FIG. 7, and stores in the route/present status traffic data storage unit 43A the link data 312 and traffic information statistical values or present status traffic data for respective constituent links constituting a recommended route (S10410).

According to the processing, travel time of respective constituent links constituting the recommended route is as follows. That is, travel time obtained from the present status traffic data is used as travel time of a first link constituting the recommended route. Also, as travel time of a (n)th link (n≧2) constituting the recommended route, travel time obtained from the present status traffic data is used in the case where the difference between the expected arrival point of time at the termination node of a (n−1)th link contiguous to the (n)th link and the current time is below a predetermined value, and travel time obtained from traffic information statistical values corresponding to a time zone including the expected arrival point of time is used in the case where the difference is not less than the predetermined value.

In addition, it does not matter in the flow shown in FIG. 21 whether the step of judgment in S10404 is modified in the following manner. That is, the route search unit 42A investigates whether the extraction link is present in a predetermined range from the destination (the current position) In the case where the extraction link is present, the route search unit 42A calculates the expected arrival point of time at the termination node of the extraction link to proceed to S10406 and in the case where the extraction link is not present, the route search unit 42A proceeds to S10405. Here, the predetermined range suffices to be one in which it is expected at a point of time when the vehicle reaches there that the traffic situation will not change much from that at present.

In this case, travel time of respective constituent links constituting the recommended route is as follows. That is, travel time obtained from the present status traffic data is used as travel time of constituent links located in the predetermined range from the destination (the current position). Also, travel time obtained from traffic information statistical values corresponding to a time zone including the expected arrival point of time is used as travel time of constituent links located outside the predetermined range from the destination (the current position).

Subsequently, the recommended route display processing (the processing in S105 shown in FIG. 20) will be described. The recommended route display processing in the present embodiment is the same as the recommended route display processing in the first embodiment, that is, the flow illustrated in the first embodiment and shown in FIG. 8. In the present embodiment, however, the current time is set to the departure point of time in S101 shown in FIG. 20. Accordingly, A graph 804 of the recommended route with the departure point of time as the current time is only displayed in FIG. 9. Also, a point of time indicated by the cursor 902 in the time display bar 901 is fixed to the current time in FIG. 10. In addition, according to the present embodiment, in the map display shown in FIG. 10, ones based on the traffic information statistical values and ones based on the present status traffic data are displayed so as to be distinguished from each other in respective jam level displaying sections.

Subsequently, the route guidance operation will be described. The route guidance operation in the present embodiment is the same as the recommended route display processing in the first embodiment, that is, the flow illustrated in the first embodiment and shown in FIG. 12. That is, instead of resetting traffic information statistical values of the remaining links (respective links from a link subsequent to the just preceding link to the last link (destination link)) in S4009 shown in FIG. 12, the cost recalculation processing, described later, of the remaining links is performed and subsequently, cost of respective remaining links as recalculated is used to recalculate the expected arrival point of time at the destination in S4010 shown in FIG. 12, results of which are output from the display 2 and the voice input/output device 4 to have a user informed thereof. In addition, the expected arrival point of time at the destination can be calculated by adding to the current time total travel time obtained from new cost of respective remaining links.

Figure 22:
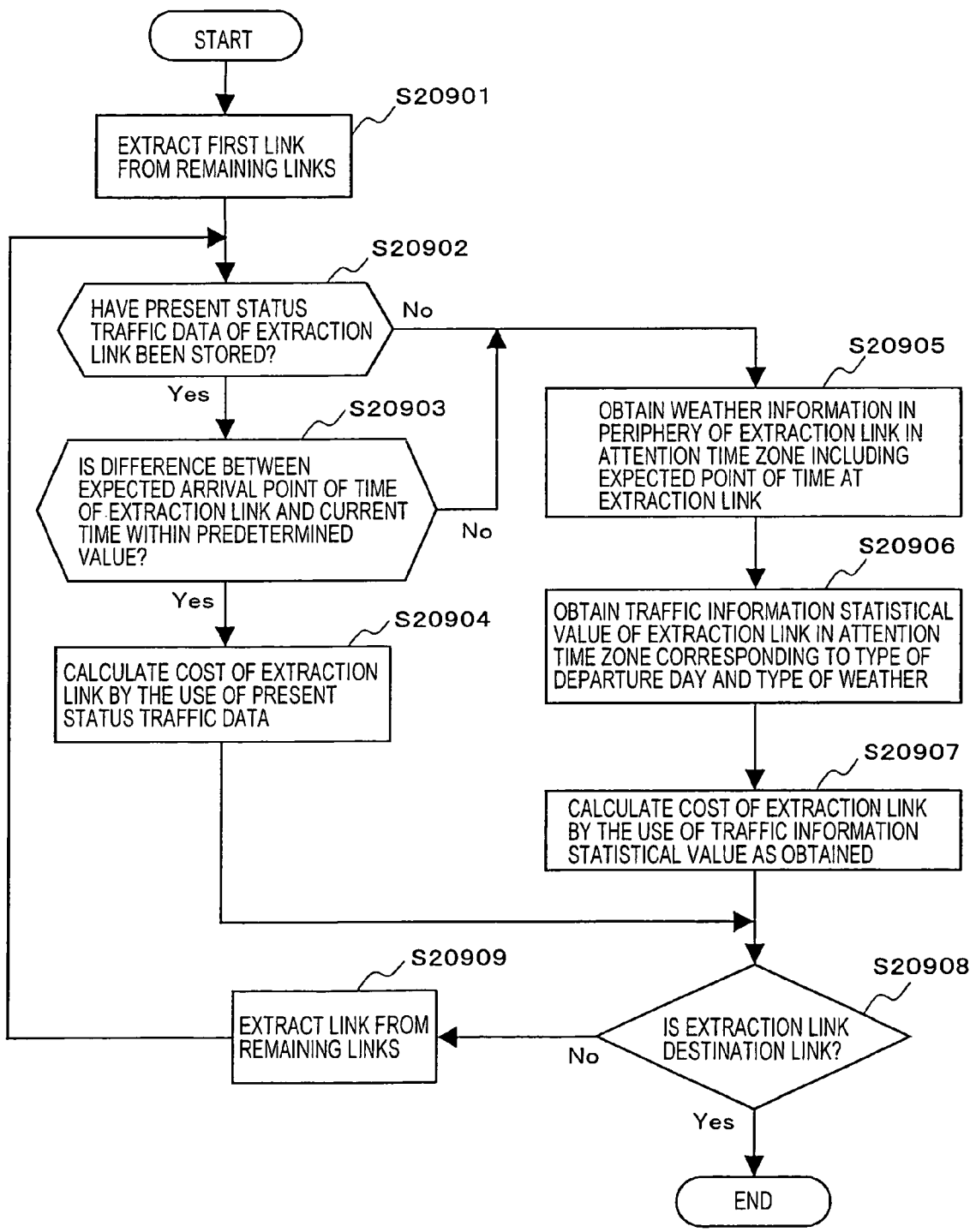
FIG. 22 is a flowchart illustrating a cost recalculation processing (processing in S4009 shown in FIG. 12) of remaining links performed in a route guidance processing according to the second embodiment of the invention.

Here, the cost recalculation processing of the remaining links will be described. FIG. 22 is a flowchart illustrating the cost recalculation processing of the remaining links.

First, the route guidance unit 44A extracts information of a first remaining link (a link in which the current position is located) out of information of respective links constituting the recommended route in the route/present status traffic data storage unit 43A (S20901).

Subsequently, the route guidance unit 44A reads out cost of respective links between a link in which the current position is located and a link just preceding a link (referred to as an extraction link) extracted in S20901 or S20909 described later, from the route/present status traffic data storage unit 43A and adds total cost of the respective links to the current time to calculate the expected arrival point of time at the initiation node of the extraction link. Then the route guidance unit 44A investigates whether present status traffic data of the mesh area including the extraction link have been stored in the route/present status traffic data storage unit 43A (S20902).

In the case where present status traffic data of the mesh area including the extraction link have been stored in the route/present status traffic data storage unit 43A in S20902, the route guidance unit 44A makes a comparison between the expected arrival point of time of the extraction link calculated in S20902 and the current time and investigates whether a time difference between the both is below a predetermined value (S20903).

Here, the predetermined value is set to a period of time thought to be too small for a large change to come out in traffic situation, that is, a period of time (for example, 30 minutes) thought to be one during which there is no large change from the traffic situation indicated by the present status traffic data having been obtained even after the predetermined value has elapsed since the current time, in the same manner in S10404 shown in FIG. 21. In addition, in the case where the extraction link is one (a link in which the current position is located) extracted in S20901, the current time is made the expected arrival point of time.

In the case where a difference between the expected arrival point of time at the initiation node and the current time is below the predetermined value, the route guidance unit 44A sets link travel time of the extraction link specified by the present status traffic data stored in the route/present status traffic data storage unit 43A, or link travel time obtained from a link moving speed and a link length to cost of the extraction link (S20904). Thereafter, the route guidance unit 44A proceeds to S20908.

Meanwhile, in the case where present status traffic data of the mesh area including the extraction link are not stored in the route/present status traffic data storage unit 43A in S20902, or the difference between the expected arrival point of time at the initiation node of the extraction link and the current time is not less than the predetermined value in S20903, the route guidance unit 44A uses the first conversion table to specify the mesh ID of the mesh area in which the initiation node of the extraction link is located. And the route guidance unit 44A obtains weather information having the specified mesh ID and a time zone (referred to as noticeable time zone) to which the expected arrival point of time at the initiation node of the extraction link belongs, from the FM multiplexing broadcasting station 5000 through the FM multiplexing broadcasting receiver 12 (S20905). The route guidance unit 44A may judge weather on the basis of status information of the operation of a wiper received through the in-vehicle LAN device 11 and outside air temperature information, and make use of the result of judgment as weather information.

Subsequently, the route guidance unit 44A accesses through the data reading unit 48 to the map/statistical traffic data storage device 3 and uses the management data 322 of the statistical traffic data 320 having the specified mesh ID to obtain that traffic information statistical value of the noticeable time zone which corresponds to a weather type specified by the weather information obtained in S20905 and a day type specified in the route search processing A, B, for the extraction link (S20906). Then the route guidance unit 44A uses the obtained traffic information statistical value to calculate cost of the extraction link in the same processing illustrated in the first embodiment and in S1009 shown in FIG. 7 (S20907). Thereafter, the route guidance unit 44A proceeds to S20908.

And the route guidance unit 44A investigates whether the extraction link is the destination link in S20908. In the case where the extraction link is not the destination link (No in S20908), the route guidance unit 44A extracts information of a remaining link subsequent to the extraction link out of information of respective links constituting the recommended route in the route/present status traffic data storage unit 43A (S20909). Then the route guidance unit 44A returns to S20902. Meanwhile, in the case where the extraction link is the destination link (Yes in S20908), the route guidance unit 44A terminates the processing.

As a result of the above, travel time (cost) of respective remaining links is as follows. That is, travel time obtained from the present status traffic data is used as travel time of a first remaining link. Also, as travel time of a (m)th link (m≧2), travel time obtained from the present status traffic data is used in the case where the difference between the expected arrival point of time at the initiation node of the (m)th remaining link and the current time is below a predetermined value, and travel time obtained from a traffic information statistical value corresponding to a time zone including the expected arrival point of time in the case where the difference is not less than the predetermined value.

In addition, it does not matter in the flow shown in FIG. 22 that the step of judgment in S20903 is modified in the following manner. More specifically, the route guidance unit 44A investigates whether the extraction link is present in a predetermined range from the destination, and the route guidance unit 44A proceeds to S20904 in the case where the extraction link is present, and proceeds to S20905 in the case where the extraction link is not present. Here, the predetermined range suffices to be one in which it is expected at a point of time when the vehicle reaches there that the traffic situation will not change much from that at present.

In this case, travel time of respective constituent links constituting the recommended route is as follows. That is, travel time obtained from the present status traffic data is used as travel time of constituent links remaining in the predetermined range from the current position. Also, travel time obtained from traffic information statistical values corresponding to a time zone including the expected arrival point of time is used as travel time of remaining links located outside the predetermined range from the current position.

Figure 23:
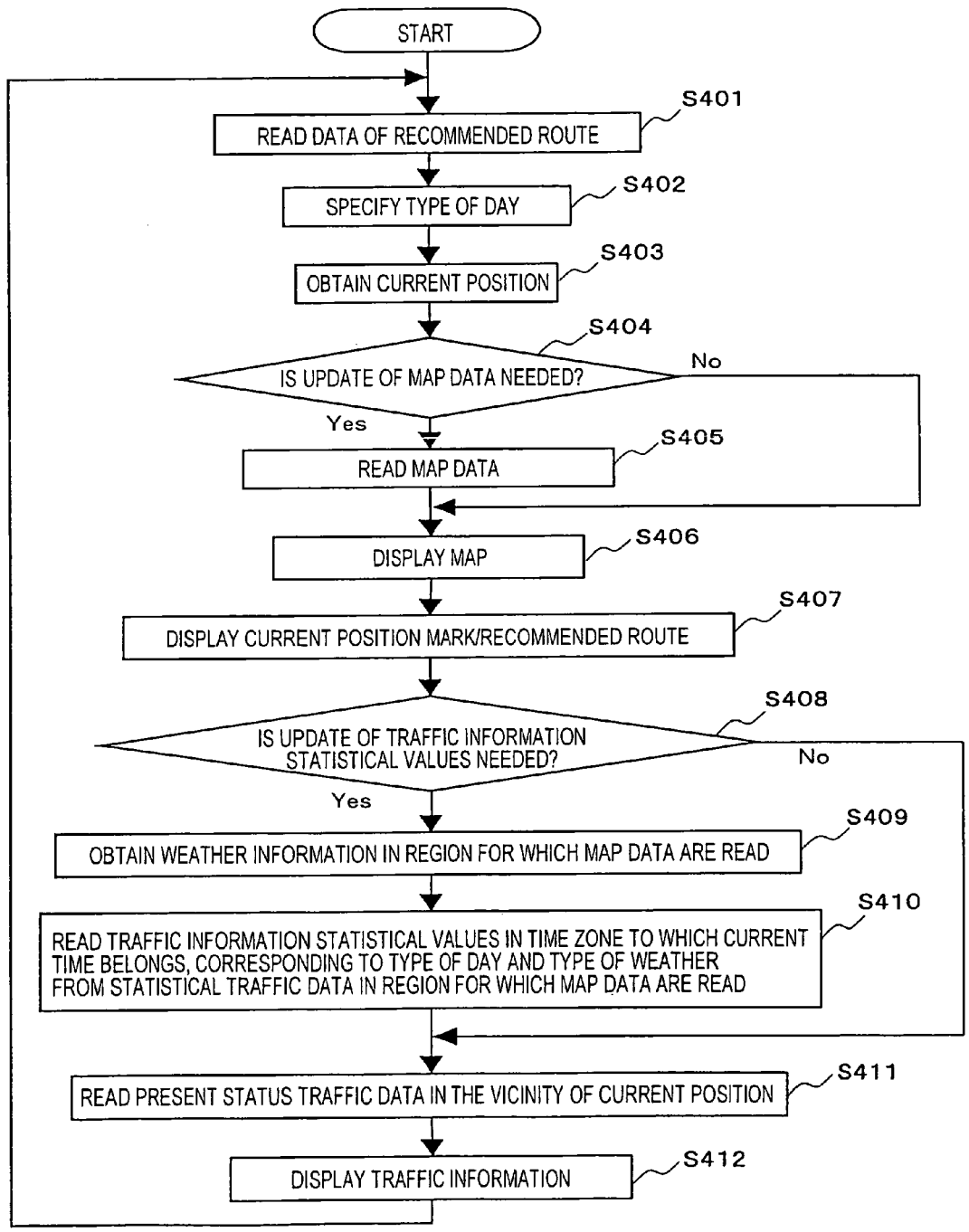
FIG. 23 is a flowchart illustrating a map display operation in route guidance according to the second embodiment of the invention.

Subsequently, the map display operation in route guidance will be described. FIG. 23 is a flowchart illustrating the map display operation in route guidance.

First, the route guidance unit 44A reads out link data of respective links constituting the recommended route from the route/present status traffic data storage unit 43A. And the route guidance unit 44A delivers map data to the map display processor 45 (S401). Then the route guidance unit 44A uses the second conversion table to specify a day type (departure day) (S402).

Next, when the route guidance unit 44A obtains the current position from the map matching processor 47 (S403), it judges whether there is a need of newly reading out map data from the map/statistical traffic data storage device 3 in order to display a map of the periphery of the current position on the display 2 (S404), and reads out map data of the periphery (however, larger than the vicinity of the current position in S411 described later) of the current position from the map/statistical traffic data storage device 3 through the data reading unit 48. And the route guidance unit 44A delivers map data to the map display processor 45 (S405).

The map display processor 45 creates the map of the periphery of the current position calculated by the map matching processor 47 on the basis of the map data received from the route guidance unit 44A, and displays the map on the display 2 through the graphics processor 51 (S406). Also, the map display processor 45 creates a current position mark and a recommended route mark on the basis of the current position calculated by the map matching processor 47 and the data of respective links received from the route guidance unit 44A, and displays the marks as well as the map on the display 2 through the graphics processor 51 (S407).

Subsequently, the route guidance unit 44A judges whether there is a need of update with respect to the traffic information statistical value as read (S408). For example, in the case where a predetermined period of time (a period of time corresponding to, for example, the unit time zone in the table 3224 shown in FIG. 4) has elapsed since traffic information statistical values were read out at the last time, the route guidance unit 44A judges that there is a need of updating the traffic information statistical values. And when it is judged that there is the need, the route guidance unit 44A uses the first conversion table to specify mesh IDs of respective mesh areas corresponding to a region indicated in the map data read out from the map/statistical traffic data storage device 3 in S405. Further, the route guidance unit 44A obtains weather information which has the specified mesh ID and to which the current time belongs, from the FM multiplexing broadcasting station 5000 through the FM multiplexing broadcasting receiver 12. Alternatively, the route guidance unit 44A judges weather from the state of the operation of a wiper and outside air temperature information received through the in-vehicle LAN device 11 (S409). Then the route guidance unit 44A reads out the statistical traffic data having the specified mesh ID and being traffic information statistical values of respective links of a time zone to which the current time belongs, the values corresponding to the day type specified in S402 and the weather type obtained or judged in S409, from the map/statistical traffic data storage device 3 through the data reading unit 48 (S410). Further, when present status traffic data of the periphery of the current position is stored in the route/present status traffic data storage unit 43A, the route guidance unit 44A reads out the data (S411).

Then for respective links included in the map of the periphery of the current position, the route guidance unit 44A delivers to the map display processor 45 link traffic information (jam level, link travel time, or the like) represented by status traffic data when the status traffic data are readout, and traffic information statistical values (jam level, link travel time, or the like) when the status traffic data are not read out.

In response thereto, the map display processor 45 displays the traffic information or the traffic information statistical values received from the route guidance unit 44A and relates them to corresponding links on the map to display the same on the display 2 through the graphics processor 51 (S412). At this time, the traffic information (status traffic data) and the traffic information statistical values (statistical traffic data) are displayed in an identifiable manner.

Figure 24:
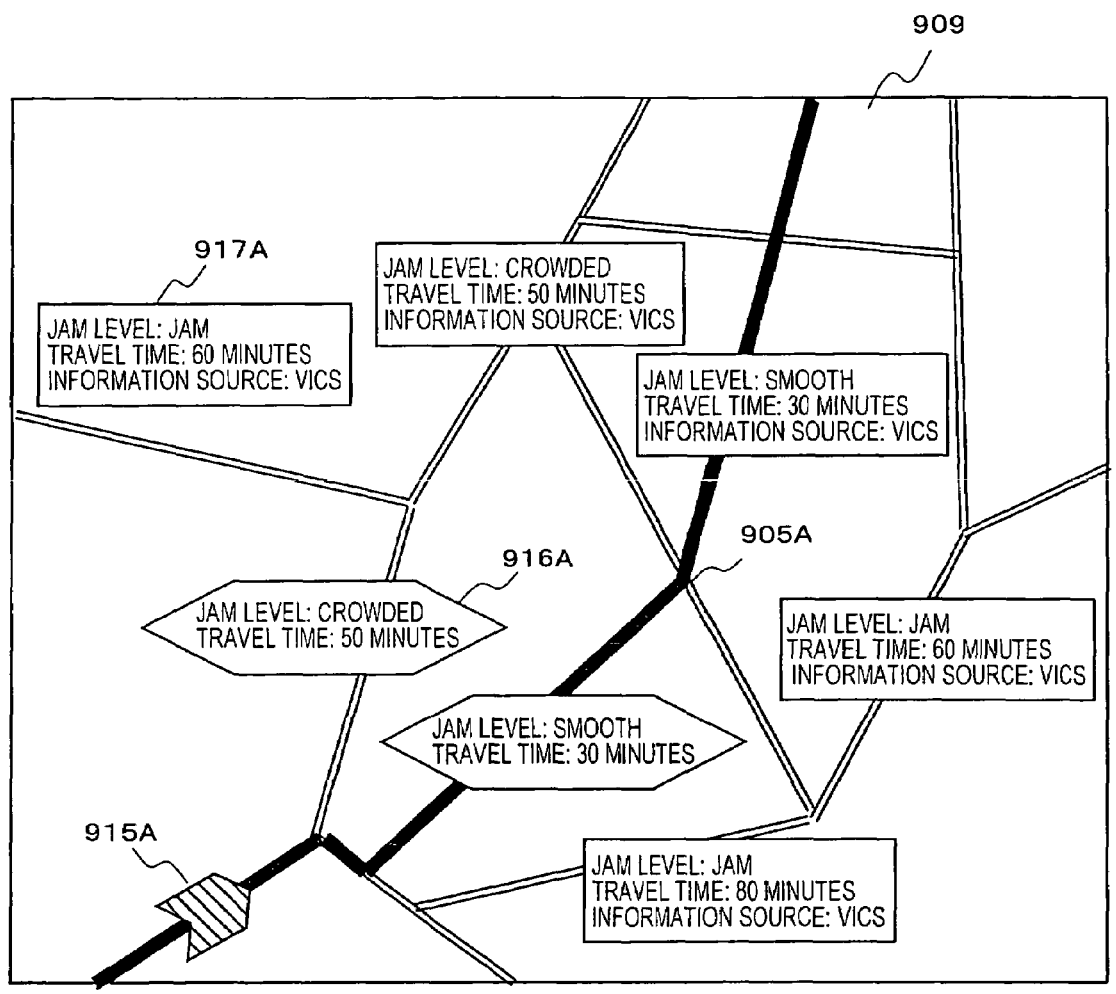
FIG. 24 shows an example of map display of the map display operation in route guidance shown in FIG. 23.

FIG. 24 shows an example of the map display in route guidance. In this example, a recommended route 905A and a current position mark 915A are displayed on a map 909. Further, traffic information (status traffic data) 916A and traffic information statistical values (statistical traffic data) 917A are displayed on respective roads of the map 909. The traffic information 916A and the traffic information statistical values 917A are displayed to be different in color and shape (frame) from each other so that the both can be identified.

The second embodiment of the invention has been described above.

According to the present embodiment, cost (travel time) of respective constituent links constituting the recommended route is as follows. That is, travel time obtained from the present status traffic data is used as travel time of a first constituent link constituting the recommended route. Also, as travel time of a (n)th link (n≧2) constituting the recommended route, travel time obtained from the present status traffic data is used in the case where the difference between the expected arrival point of time at the termination node of a (n−1)th link contiguous to the (n)th link and the current time is below a predetermined value, and travel time obtained from traffic information statistical values corresponding to a time zone including the expected arrival point of time is used in the case where the difference is not less than the predetermined value.

Alternatively, travel time obtained from the present status traffic data is used as travel time of constituent links located in a predetermined range from the departure position, and travel time obtained from traffic information statistical values corresponding to a time zone including the expected arrival point of time is used as travel time of constituent links located outside the predetermined range from the departure position.

In this manner, a recommended route of minimum cost (travel time) can be accurately searched by searching a recommended route from the current position to the destination using present status traffic information (present status traffic data) for the periphery of the current position and using traffic information statistical values (statistical traffic information) collected in the past for that region except the periphery of the current position in which it is possible that the situation will change from the present traffic information when the user reaches there. Further, in the case of using the traffic information statistical values, a recommended route of minimum cost (travel time) can be further accurately searched by changing a time zone of the traffic information statistical values according to an expected arrival point of time at the initiation node of respective links from the departure position.

Also, according to the embodiment, a comparison is made in the route guidance processing between actual travel time from the departure position of the recommended route to the current position and total travel time of a section from the departure position of the recommended route to the current position, which is obtained from cost of the links constituting the section, and the need of searching a recommended route again is judged according to the result of comparison. And in the case where it is judged that there is a need of searching a recommended route again, a recommended route to the destination is searched again with the current time as the departure point of time. In this manner, even when the vehicle runs on the current recommended route, it is possible during route guidance to search a new recommended route again so that the vehicle runs on a route of minimum cost (travel time).

Also, according to the embodiment, the expected arrival point of time at the destination is corrected by calculating cost of remaining links (respective links on the recommended route between the current position and the destination) in view of present status traffic data in the current position. By doing this, it is possible to enhance the accuracy of an expected arrival point of time.

Further, according to the embodiment, the degree of jam on respective roads is displayed on the map display in the route guidance processing by the use of present status traffic information (present status traffic data) for the periphery of the current position in which it is less possible that the situation will change from the present traffic information when the user reaches there, and traffic information statistical values (statistical traffic data) collected in the past for that region except the periphery of the current position in which it is possible that the situation will change from the present traffic information when a user reaches there. Accordingly, it is possible to display the degree of jam on roads in view of the possibility that a user encounters such jam.

In addition, the invention is not limited to the respective embodiments described above. The invention is susceptible of various modifications within the scope thereof.

For example, the search condition used in deciding traffic information statistical values for use in cost-calculation in the respective embodiments is not limited to the combination of a day type and a weather type. The day type or the weather type may be singly used as the search condition. Alternatively, a separate condition may be combined with the day type and the weather type to manage traffic information statistical values.

Also, setting of plural departure points of time including the current time may be received from the user also in the second embodiment to enable searching the recommended route at the respective departure points of time to present the same to the user in the same manner as in the first embodiment.

Further, according to the second embodiment, FM multiplexing broadcasting signals are made use of to obtain outline present status traffic data and weather information. However, the invention is not limited thereto. Outline present status traffic data and weather information may be obtained by the use of other methods (for example, digital ground wave broadcasting, and satellite digital broadcasting) than FM multiplexing broadcasting.

Further, while the respective embodiments have been described with respect to application of the invention to an in-vehicle type navigation device, the invention is applicable to navigation devices except the in-vehicle type one.

As described above, it is possible according to the invention to accurately search a recommended route by the use of traffic information collected in the past, or traffic information collected in the past and present status traffic information. Also, it is possible to divide and display the tendency of jam on roads according to circumstances in such a display manner that a user can recognize a change in jam on roads due to a change in time zone. Further, the degree of jam on roads can be displayed in view of the possibility that the user encounters the jam.

The invention claimed is:

1. A computer-implemented route search method for a navigation device, wherein
the navigation device includes a storage device which stores map data including link data of respective links constituting roads on a map, and statistical data including travel time or moving speeds of the respective links determined by statistical values of traffic information collected in the past, said statistical data being classified according to differing predetermined environmental conditions existing during collection of the traffic information, and the route search method comprises:
setting step which sets a departure position, a destination, and environmental conditions for searching; and
recommended route searching step which searches a recommended route from the departure position to the destination, by using the map data stored in the storage device and statistical data corresponding to the environmental conditions set in the setting step out of the statistical data stored in the storage device;
wherein, in the route searching step, the statistical data corresponding to the environmental condition of respective candidate links constituting a recommended route, is used.

2. The computer-implemented route search method according to claim 1, wherein
the statistical data includes travel time or moving speeds of the respective links every time zone, and the recommended route searching step searches the recommended route by using, as travel time of respective first candidate links constituting the recommended route, travel time corresponding to a time zone including a departure point of time at the departure position included or travel time obtained from moving speeds corresponding to the time zone concerning and, as travel time of respective (n)th (n≧2) candidate links constituting the recommended route, travel time corresponding to a time zone including an expected arrival point of time at the termination node of a (n−1)th candidate link contiguous to the (n)th candidate link or travel time obtained from moving speeds corresponding to the time zone concerned.

3. The computer-implemented route search method according to claim 1, further comprising:

travel time calculating step which calculates travel time or an expected arrival point of time for the recommended route by using travel time of respective links constituting the recommended route used in searching the recommended route in the recommended route searching step, and travel time displaying step which displays travel time or an expected arrival point of time for the recommended route which is calculated in the travel time calculating step.

4. The computer-implemented route search method according to claim 3, wherein the statistical data includes a degree of dispersion in traffic information being a source of travel time or moving speeds of the respective links, the travel time calculating step calculates an error in travel time for the recommended route by using degree of dispersion in traffic information being a source of travel time or moving speeds of respective links constituting the recommended route, said travel time or moving speeds being used in searching the recommended route in the recommended route searching step, and the travel time displaying step displays travel time or an expected arrival point of time for the recommended route which is calculated in the travel time calculating step, and an error thereof.

5. The computer-implemented route search method according to claim 3, wherein the statistical data includes a degree of jam every time zone of the respective links, the travel time calculating step determines a degree of jam in respective sections which are obtained by dividing the recommended route into a plurality of the sections, by using a degree of jam in a time zone corresponding to travel time or moving speeds of respective links constituting the recommended route, said travel time or moving speeds being used in searching the recommended route in the recommended route searching step, and the travel time displaying step displays travel time for the recommended route which is calculated in the travel time calculating step, and a degree of jam in the respective sections of the recommended route.

6. The computer-implemented route search method according to claim 2, wherein the navigation device has a current position calculating function, and further comprising:

route guidance step which performs route guidance to the destination by using the recommended route searched in the recommended route searching step and the current position calculated by the current position calculating function, and expected arrival point of time correcting step which corrects an expected arrival point of time at the destination by calculating travel time for a section between the destination and the current position which disposed on the recommended route and is calculated by the current position calculating function, wherein the expected arrival point of time correcting step calculates travel time for the section, by using, as travel time for a first link constituting the section, travel time corresponding to a time zone including current time, or travel time obtained from moving speeds corresponding to the time zone concerned, and as travel time for respective (m)th (m≧2) links constituting the section, travel time corresponding to a time zone including a point of time obtained by adding to current time total travel time between the first link and a (m−1)th link, or travel time obtained from moving speeds corresponding to the time zone concerned, and adds to current time the travel time for the section to obtain an expected arrival point of time at the destination.

7. The computer-implemented route search method according to claim 2, wherein the navigation device has a current position calculating function, and further comprising:

route guidance step which performs route guidance to a destination by using a recommended route searched in the recommended route searching step and a current position calculated by the current position calculating function, and re-search judgment step which compares actual travel time for a section on the recommended route from the departure position to the current position, with travel time for the section concerned on the recommended route which is obtained from travel time for respective links constituting the recommended route and used in searching the recommended route in the recommended route searching step, and judges the necessity of searching a recommended route again according to the result of the comparison, and wherein the route searching step searches a recommended route to the destination set in the setting step again with the current position calculated by the current position calculating function as a departure position and current time as a departure point of time in the case where it is judged in the re-search judgment step that it is necessary to search a recommended route again.

8. A computer-implemented route search method for a navigation device which has a current position detecting function, wherein the navigation device includes a storage device which stores map data including link data of respective links, and statistical data including travel time or moving speeds of the respective links constituting roads on the map, said travel time or moving speeds being determined by traffic information statistical values collected in the past, and the route search method comprising:

a setting step which sets a destination position, a present status data obtaining step which obtains present status data including travel time or moving speeds determined by present traffic information of respective links located in a peripheral region of the current position detected by the current position detecting function, from outside, and a route searching step which searches a recommended route from the current position to the destination by using the map data and the statistical data stored in the storage device and the present status data obtained in the present status data obtaining step;

wherein the present status data obtaining step obtains a general present status data of respective links around a periphery of the current position, and obtains the present status data when a predetermined data of the general present status data and a predetermined data of the statistical data are different from each other.

9. The computer-implemented route search method according to claim 8, further comprising general present status data obtaining step which obtains general present status data including a degree of jam in respective links located in the peripheral region of the current position, from outside, and wherein the statistical data includes a degree of jam in travel every link, and in the case where a degree of jam in respective links located in the peripheral region of the current position, which is indicated by the general present status data, and a degree of jam in respective links located in the peripheral region of the current position, which is included in the statistical data, are different from each other, the present status data obtaining step obtains present status data of respective links located in the peripheral region of the current position, from outside.

10. The computer-implemented route search method according to claim 8, further comprising general present status data obtaining step which obtains general present status data including a degree of jam in respective links located in the peripheral region of the current position, from outside, and wherein the present status data includes a degree of jam in travel every link, and in the case where the general present status data of respective links located in the peripheral region of the current position has been obtained, and a degree of jam in respective links located in the peripheral region of the current position, which is indicated by the general present status data concerned, and a degree of jam in respective links located in the peripheral region of the current position, which is indicated by the already obtained general present status data, are different from each other, the present status data obtaining step obtains again, from outside, present status data of respective links located in the peripheral region of the current position.

11. The computer-implemented route search method according to claim 8, wherein the present status data obtaining step does not newly obtain present status data of respective links located in the current position, from outside, until a predetermined period of time has elapsed since the present status data is obtained.

12. The computer-implemented route search method according to claim 8, wherein the present status data obtaining step newly obtains present status data of respective links located in the peripheral region of the current position, from outside, in the case where a predetermined period of time has elapsed since the present status data is obtained.

13. The computer-implemented route search method according to claim 8, further comprising traffic restriction information obtaining step which obtains traffic restriction information for roads from outside, and wherein the present status data obtaining step obtains present status data of respective links located in the peripheral region of the current position, from outside, in the case where traffic restriction information for the peripheral region of the current position is obtained.

14. The computer-implemented route search method according to claim 8, wherein the route searching step searches the recommended route by using, as travel time for respective first candidate links constituting the recommended route, travel time in the present status data or travel time obtained from moving speeds in the present status data, and as travel time for respective (n)th (n≧2) candidate links constituting the recommended route, travel time in the present status data or travel time obtained from moving speeds in the present status data, which is provided in the case that a time difference between an expected arrival point of time at the termination node of a (n−1)th link contiguous to the (n)th link and a departure point of time at the departure position is below a predetermined value, and travel time in the statistical data or travel time obtained from moving speeds in the statistical data, which is provided in the case that the time difference is not less than the predetermined value.

15. The computer-implemented route search method according to claim 8, wherein the route searching step searches the recommended route by using, as travel time for candidate links of respective links constituting the recommended route, travel time in the present status data or travel time obtained from moving speeds in the present status data for candidate links located in the peripheral region of the current position, and travel time in the statistical data or travel time obtained from moving speeds for candidate links located outside the peripheral region of the current position.

16. The computer-implemented route search method according to claim 8, further comprising:

travel time calculating step which calculates travel time for the recommended route or an expected arrival point of time by using travel time of respective links constituting the recommended route used in searching the recommended route in the route searching step, and travel time displaying step which displays travel time for the recommended route or an expected arrival point of time calculated in the travel time calculating step, and wherein the statistical data and the present status data include a degree of jam in every link, the travel time calculating step determines a degree of jam in respective sections which are obtained by dividing the recommended route into a plurality of the sections, by using a degree of jam in the present status data for the link for which the present status data are used in the route searching step, and a degree of jam in the present status data for the link for which the statistical data are used in the route searching step, among links constituting the recommended route, and the travel time displaying step displays travel time for the recommended route calculated in the travel time calculating step, and a degree of jam in respective sections of the recommended route.

17. The computer-implemented route search method according to claim 8, further comprising:

travel time calculating step which calculates travel time or an expected arrival point of time for the recommended route searched in the route searching step by using the statistical data stored in the storage device and the present status data obtained in the present status data obtaining step, and travel time displaying step which displays travel time for the recommended route or an expected arrival point of time calculated in the travel time calculating step.

18. The computer-implemented route search method according to claim 8, further comprising:

route guidance step which performs route guidance to the destination by using the recommended route searched in the recommended route searching step and the current position calculated by the current position calculating function, and expected arrival point of time correcting step which corrects an expected arrival point of time at the destination by calculating travel time for a section between the destination and the current position which is disposed on the recommended route, and wherein the expected arrival point of time correcting step calculates travel time for the section, by using, as travel time for a first link constituting the section, travel time for the link determined from the present status data or travel time obtained from moving speeds for the link determined from the present status data, and as travel time for respective (m)th (m≧2) links constituting the section, travel time for the links determined from the present status data or travel time obtained from moving speeds for the links determined from the present status data, which is provided in the case that total travel time from the first link to a (m−1)th link is below a predetermined value, and travel time for the link in the statistical data or travel time obtained from moving speeds for the link in the statistical data, which is provided in the case that the total travel time is not less than the predetermined value, and adds travel time for the section to current time to obtain an expected arrival point of time at the destination.

19. The computer-implemented route search method according to claim 8, further comprising:

route guidance step which performs route guidance to the destination by using the recommended route searched in the recommended route searching step and the current position, and expected arrival point of time correcting step which corrects an expected arrival point of time at the destination by calculating travel time for a section between the destination and the current position disposed on the recommended route, and wherein the expected arrival point of time correcting step calculates travel time for the section, by using, as travel time for respective links constituting the section, travel time for links located in the peripheral region of the current position in the present status data or travel time obtained from moving speeds for the links concerned in the present status data, and travel time for links located outside the peripheral region of the current position in the statistical data or travel time obtained from moving speeds for the links concerned in the statistical data, and adds to current time the travel time for the section to obtain an expected arrival point of time at the destination.

20. A computer-implemented route search navigation device which has a current position detecting function, comprising:

a storage device which stores map data including link data of respective links, and statistical data including travel time or moving speeds of the respective links constituting roads on the map, said travel time or moving speeds being determined by traffic information statistical values collected in the past;

a setting unit adapted to set a destination position, a present status data obtaining unit adapted to obtain present status data including travel time or moving speeds determined by present traffic information of respective links located in a peripheral region of a current position detected by the current position detecting function, from outside, and a route searching unit adapted to search a recommended route from the current position to the destination by using the map data and the statistical data stored in the storage device and the present status data obtained in the present status data obtaining unit;

wherein the present status data obtaining unit obtains a general present status data of respective links around a periphery of the current position, and obtains the present status data when a predetermined data of the general present status data and a predetermined data of the statistical data are different from each other.

21. A computer-implemented route search navigation device, comprising:

a storage device which stores map data including link data of respective links constituting roads on a map, and statistical data including travel time or moving speeds of the respective links determined by statistical values of traffic information collected in the past, said statistical data being classified according to differing predetermined environmental conditions existing during collection of the traffic information;

a setting device adapted to set a departure position, a destination, and environmental conditions for searching; and a route searching unit adapted to search a recommended route from the departure position to the destination, by using the map data stored in the storage device and statistical data corresponding to the environmental conditions set in the setting device out of the statistical data stored in the storage device;

wherein, in the route searching unit, the statistical data corresponding to the environmental condition of respective candidate links constituting a recommended route, is used.

* * * * *